(12) United States Patent
Sato

(10) Patent No.: US 9,214,123 B2
(45) Date of Patent: Dec. 15, 2015

(54) LIQUID CRYSTAL DISPLAY DEVICE AND METHOD FOR DRIVING THE SAME

(71) Applicant: JVC KENWOOD Corporation, Yokohama-shi (JP)

(72) Inventor: Akihiro Sato, Yokosuka (JP)

(73) Assignee: JVC KENWOOD Corporation, Yokohama-shi (JP)

(*) Notice: Subject to any disclaimer, the term of this patent is extended or adjusted under 35 U.S.C. 154(b) by 22 days.

(21) Appl. No.: 14/289,507

(22) Filed: May 28, 2014

(65) Prior Publication Data

US 2014/0267462 A1 Sep. 18, 2014

Related U.S. Application Data

(63) Continuation of application No. PCT/JP2012/078989, filed on Nov. 8, 2012.

(30) Foreign Application Priority Data

Nov. 30, 2011 (JP) ................... 2011-261771
Oct. 5, 2012 (JP) ................... 2012-222847

(51) Int. Cl.
*G09G 5/10* (2006.01)
*G09G 3/36* (2006.01)
(Continued)

(52) U.S. Cl.
CPC .............. *G09G 3/3648* (2013.01); *G02F 1/133* (2013.01); *G09G 3/2022* (2013.01); *G09G 3/2059* (2013.01); *G09G 3/3614* (2013.01); *G09G 3/3659* (2013.01); *G09G 2300/0809* (2013.01); *G09G 2300/0814* (2013.01); *G09G 2320/0204* (2013.01); *G09G 2320/046* (2013.01); *G09G 2330/04* (2013.01)

(58) Field of Classification Search
None
See application file for complete search history.

(56) References Cited

U.S. PATENT DOCUMENTS 6,288,712 B1 9/2001 Pinkham et al.
2001/0040566 A1 11/2001 Pinkham et al.

FOREIGN PATENT DOCUMENTS

JP 2001-523847 A 11/2001
JP 2004-191574 A 7/2004
(Continued)

OTHER PUBLICATIONS

Shigeo Shimizu et al., "6.4: Invited Paper: Fully Digital D-ILA™ Device for Consumer Applications," <http://www.videovantage.com/wp-content/uploads/2009/12/sid-06_04_jvc_digital_drive.pdf>.

(Continued)

*Primary Examiner* — Kenneth B Lee, Jr.
(74) *Attorney, Agent, or Firm* — Venable LLP; Michael A. Sartori

(57) ABSTRACT

A first sample holding unit (22) samples and holds subframe data on a column data line (D) inputted via a first switching unit (21) when a pixel (20) is selected by a row selection signal applied via a row selection line (W). After the subframe data is held by the first sample holding units (22) of all pixels, a second sample holding unit (24) samples and holds the subframe data inputted through a second switching unit (23) activated by a common signal to apply the subframe data to a pixel electrode (12) of a liquid crystal element (LC). Consequently, a voltage selection unit between the second sample holding unit (24) and the pixel electrode (12) becomes unnecessary as well as subframe data can be transferred without a suspension period of the subframe data.

8 Claims, 19 Drawing Sheets

(51) Int. Cl.
   *G09G 3/20* (2006.01)
   *G02F 1/133* (2006.01)

(56) References Cited

FOREIGN PATENT DOCUMENTS

| | | | |
|---|---|---|---|
| JP | 2005-025048 A | 1/2005 |
| JP | 2006-171651 A | 6/2006 |
| JP | 2010-286738 A | 12/2010 |
| JP | 2011-215635 A | 10/2011 |
| WO | WO 99/26226 A1 | 5/1999 |

OTHER PUBLICATIONS

International Search Report and Written Opinion in PCT International Application No. PCT/JP2012/078989, dated Jan. 29, 2013.

| GRAY-SCALE | SF1 | SF2 | SF3 | SF4 | SF5 | SF6 | SF7 | SF8 | SF9 | SF10 | SF11 | SF12 | SF13 | SF14 | SF15 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 | 0 | 0 | 0 |
| 5 | 1 | 1 | 1 | 1 | 1 | 0 | 0 | 0 | 0 | 0 | 0 | 0 | 0 | 0 | 0 |
| 6 | 1 | 1 | 1 | 1 | 1 | 1 | 0 | 0 | 0 | 0 | 0 | 0 | 0 | 0 | 0 |
| 7 | 1 | 1 | 1 | 1 | 1 | 1 | 1 | 0 | 0 | 0 | 0 | 0 | 0 | 0 | 0 |
| 8 | 1 | 1 | 1 | 1 | 1 | 1 | 1 | 1 | 0 | 0 | 0 | 0 | 0 | 0 | 0 |
| 9 | 1 | 1 | 1 | 1 | 1 | 1 | 1 | 1 | 1 | 0 | 0 | 0 | 0 | 0 | 0 |
| 10 | 1 | 1 | 1 | 1 | 1 | 1 | 1 | 1 | 1 | 1 | 0 | 0 | 0 | 0 | 0 |
| 11 | 1 | 1 | 1 | 1 | 1 | 1 | 1 | 1 | 1 | 1 | 1 | 0 | 0 | 0 | 0 |
| 12 | 1 | 1 | 1 | 1 | 1 | 1 | 1 | 1 | 1 | 1 | 1 | 1 | 0 | 0 | 0 |
| 13 | 1 | 1 | 1 | 1 | 1 | 1 | 1 | 1 | 1 | 1 | 1 | 1 | 1 | 0 | 0 |
| 14 | 1 | 1 | 1 | 1 | 1 | 1 | 1 | 1 | 1 | 1 | 1 | 1 | 1 | 1 | 0 |
| 15 | 1 | 1 | 1 | 1 | 1 | 1 | 1 | 1 | 1 | 1 | 1 | 1 | 1 | 1 | 1 |

1 DRIVING PERIOD
0 BLANKING PERIOD

| GRAY-SCALE | SF1 | SF2 | SF3 | SF4 | SF5 | SF6 | SF7 | SF8 | SF9 | SF10 | SF11 | SF12 | SF13 | SF14 | SF15 | SF16 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 | 0 | 0 | 0 |
| 4 | 0 | 1 | 1 | 0 | 0 | 0 | 0 | 0 | 0 | 0 | 0 | 0 | 0 | 0 | 0 | 0 |
| 5 | 1 | 1 | 1 | 0 | 0 | 0 | 0 | 0 | 0 | 0 | 0 | 0 | 0 | 0 | 0 | 0 |
| 6 | 0 | 1 | 1 | 1 | 0 | 0 | 0 | 0 | 0 | 0 | 0 | 0 | 0 | 0 | 0 | 0 |
| 7 | 1 | 1 | 1 | 1 | 0 | 0 | 0 | 0 | 0 | 0 | 0 | 0 | 0 | 0 | 0 | 0 |
| 8 | 0 | 1 | 1 | 1 | 1 | 0 | 0 | 0 | 0 | 0 | 0 | 0 | 0 | 0 | 0 | 0 |
| 9 | 1 | 1 | 1 | 1 | 1 | 0 | 0 | 0 | 0 | 0 | 0 | 0 | 0 | 0 | 0 | 0 |
| 10 | 0 | 1 | 1 | 1 | 1 | 1 | 0 | 0 | 0 | 0 | 0 | 0 | 0 | 0 | 0 | 0 |
| 11 | 1 | 1 | 1 | 1 | 1 | 1 | 0 | 0 | 0 | 0 | 0 | 0 | 0 | 0 | 0 | 0 |
| 12 | 0 | 1 | 1 | 1 | 1 | 1 | 1 | 0 | 0 | 0 | 0 | 0 | 0 | 0 | 0 | 0 |
| 13 | 1 | 1 | 1 | 1 | 1 | 1 | 1 | 0 | 0 | 0 | 0 | 0 | 0 | 0 | 0 | 0 |
| 14 | 0 | 1 | 1 | 1 | 1 | 1 | 1 | 1 | 0 | 0 | 0 | 0 | 0 | 0 | 0 | 0 |
| 15 | 1 | 1 | 1 | 1 | 1 | 1 | 1 | 1 | 0 | 0 | 0 | 0 | 0 | 0 | 0 | 0 |
| 16 | 0 | 1 | 1 | 1 | 1 | 1 | 1 | 1 | 1 | 0 | 0 | 0 | 0 | 0 | 0 | 0 |
| 17 | 1 | 1 | 1 | 1 | 1 | 1 | 1 | 1 | 1 | 0 | 0 | 0 | 0 | 0 | 0 | 0 |
| 18 | 0 | 1 | 1 | 1 | 1 | 1 | 1 | 1 | 1 | 1 | 0 | 0 | 0 | 0 | 0 | 0 |
| 19 | 1 | 1 | 1 | 1 | 1 | 1 | 1 | 1 | 1 | 1 | 0 | 0 | 0 | 0 | 0 | 0 |
| 20 | 0 | 1 | 1 | 1 | 1 | 1 | 1 | 1 | 1 | 1 | 1 | 0 | 0 | 0 | 0 | 0 |
| 21 | 1 | 1 | 1 | 1 | 1 | 1 | 1 | 1 | 1 | 1 | 1 | 0 | 0 | 0 | 0 | 0 |
| 22 | 0 | 1 | 1 | 1 | 1 | 1 | 1 | 1 | 1 | 1 | 1 | 1 | 0 | 0 | 0 | 0 |
| 23 | 1 | 1 | 1 | 1 | 1 | 1 | 1 | 1 | 1 | 1 | 1 | 1 | 0 | 0 | 0 | 0 |
| 24 | 0 | 1 | 1 | 1 | 1 | 1 | 1 | 1 | 1 | 1 | 1 | 1 | 1 | 0 | 0 | 0 |
| 25 | 1 | 1 | 1 | 1 | 1 | 1 | 1 | 1 | 1 | 1 | 1 | 1 | 1 | 0 | 0 | 0 |
| 26 | 0 | 1 | 1 | 1 | 1 | 1 | 1 | 1 | 1 | 1 | 1 | 1 | 1 | 1 | 0 | 0 |
| 27 | 1 | 1 | 1 | 1 | 1 | 1 | 1 | 1 | 1 | 1 | 1 | 1 | 1 | 1 | 0 | 0 |
| 28 | 0 | 1 | 1 | 1 | 1 | 1 | 1 | 1 | 1 | 1 | 1 | 1 | 1 | 1 | 1 | 0 |
| 29 | 1 | 1 | 1 | 1 | 1 | 1 | 1 | 1 | 1 | 1 | 1 | 1 | 1 | 1 | 1 | 0 |
| 30 | 0 | 1 | 1 | 1 | 1 | 1 | 1 | 1 | 1 | 1 | 1 | 1 | 1 | 1 | 1 | 1 |
| 31 | 1 | 1 | 1 | 1 | 1 | 1 | 1 | 1 | 1 | 1 | 1 | 1 | 1 | 1 | 1 | 1 |

1 DRIVING PERIOD
0 BLANKING PERIOD

FIG.22

EVEN-NUMBERED FRAME

| ORDER OF DRIVE (A) | TRANS-FER SF (B) | PERIOD (C) | DATA INVERSION SIGNAL (D) (1: INVERSION) | DRIVE POLARITY (E) (0:DC+/ 1:DC-) | 0: WHITE/ 1: INTER-MEDIATE DRIVE (F) | (DRIVING SF) (G) | (Vcom) (H) | (VcomH) (I) | (Vdd) (J) |
|---|---|---|---|---|---|---|---|---|---|
| 0 | SF1 | 1041 [μs] | 0 | 0 | 0 | SF16 (PREVIOUS FRAME) | L | HH | VddH |
| 1 | SF2 | 1041 [μs] | 1 | 0 | 1 | SF1 | L | HL | VddL |
| 2 | SF3 | 1041 [μs] | 0 | 1 | 0 | SF2 | H | HH | VddH |
| 3 | SF4 | 1041 [μs] | 1 | 0 | 0 | SF3 | L | HH | VddH |
| 4 | SF5 | 1041 [μs] | 0 | 1 | 0 | SF4 | H | HH | VddH |
| 5 | SF6 | 1041 [μs] | 1 | 0 | 0 | SF5 | L | HH | VddH |
| 6 | SF7 | 1041 [μs] | 0 | 1 | 0 | SF6 | H | HH | VddH |
| 7 | SF8 | 1041 [μs] | 1 | 0 | 0 | SF7 | L | HH | VddH |
| 8 | SF9 | 1041 [μs] | 0 | 1 | 0 | SF8 | H | HH | VddH |
| 9 | SF10 | 1041 [μs] | 1 | 0 | 0 | SF9 | L | HH | VddH |
| 10 | SF11 | 1041 [μs] | 0 | 1 | 0 | SF10 | H | HH | VddH |
| 11 | SF12 | 1041 [μs] | 1 | 0 | 0 | SF11 | L | HH | VddH |
| 12 | SF13 | 1041 [μs] | 0 | 1 | 0 | SF12 | H | HH | VddH |
| 13 | SF14 | 1041 [μs] | 1 | 0 | 0 | SF13 | L | HH | VddH |
| 14 | SF15 | 1041 [μs] | 0 | 1 | 0 | SF14 | H | HH | VddH |
| 15 | SF16 | 1041 [μs] | 1 | 0 | 0 | SF15 | L | HH | VddH |

ODD-NUMBERED FRAME

| ORDER OF DRIVE (K) | TRANS-FER SF (L) | PERIOD (M) | DATA INVERSION SIGNAL (N) | DRIVE POLARITY (O) (0:DC+/ 1:DC-) | 0: WHITE/ 1: INTER-MEDIATE DRIVE (P) | (DRIVING SF) (Q) | (Vcom) (R) | (VcomH) (S) | (Vdd) (T) |
|---|---|---|---|---|---|---|---|---|---|
| 0 | SF1 | 1041 [μs] | 1 | 1 | 0 | SF16 (PREVIOUS FRAME) | H | HH | VddH |
| 1 | SF2 | 1041 [μs] | 0 | 1 | 1 | SF1 | H | HL | VddL |
| 2 | SF3 | 1041 [μs] | 1 | 0 | 0 | SF2 | L | HH | VddH |
| 3 | SF4 | 1041 [μs] | 0 | 1 | 0 | SF3 | H | HH | VddH |
| 4 | SF5 | 1041 [μs] | 1 | 0 | 0 | SF4 | L | HH | VddH |
| 5 | SF6 | 1041 [μs] | 0 | 1 | 0 | SF5 | H | HH | VddH |
| 6 | SF7 | 1041 [μs] | 1 | 0 | 0 | SF6 | L | HH | VddH |
| 7 | SF8 | 1041 [μs] | 0 | 1 | 0 | SF7 | H | HH | VddH |
| 8 | SF9 | 1041 [μs] | 1 | 0 | 0 | SF8 | L | HH | VddH |
| 9 | SF10 | 1041 [μs] | 0 | 1 | 0 | SF9 | H | HH | VddH |
| 10 | SF11 | 1041 [μs] | 1 | 0 | 0 | SF10 | L | HH | VddH |
| 11 | SF12 | 1041 [μs] | 0 | 1 | 0 | SF11 | H | HH | VddH |
| 12 | SF13 | 1041 [μs] | 1 | 0 | 0 | SF12 | L | HH | VddH |
| 13 | SF14 | 1041 [μs] | 0 | 1 | 0 | SF13 | H | HH | VddH |
| 14 | SF15 | 1041 [μs] | 1 | 0 | 0 | SF14 | L | HH | VddH |
| 15 | SF16 | 1041 [μs] | 0 | 1 | 0 | SF15 | H | HH | VddH |

LIQUID CRYSTAL DISPLAY DEVICE AND METHOD FOR DRIVING THE SAME

CROSS-REFERENCE TO RELATED APPLICATIONS

This application is a continuation of International Application No. PCT/JP2012/078989, filed on Nov. 8, 2012 which claims the benefit of priority of the prior Japanese Patent Application No. 2011-261771, filed on Nov. 30, 2011 and Japanese Patent Application No. 2012-222847, filed on Oct. 5, 2012, the entire contents of which are incorporated herein by reference.

BACKGROUND OF THE INVENTION

1. Field of the Invention

The present invention relates to a liquid crystal display device and a method for driving the same.

2. Description of the Related Art

Drive systems of a liquid crystal display element used for a liquid crystal display device (LCD) include an analog drive system and a digital drive system. In the analog drive system, a voltage value applied to a pixel is a continuous analog value. In the digital drive system, the magnitude of a voltage applied to a pixel is set to be binary, and duration of an applied voltage is changed depending on the brightness (grayscale) of an image. Accordingly, an effective voltage value applied to a liquid crystal pixel is controlled. In the digital drive system, only information of "0" or "1" (subframe data) is applied to a pixel. Therefore, the digital drive system has a feature to be resistant to the influence of an external factor such as noise.

Moreover, if a liquid crystal such as a TN (Twisted Nematic) mode or a VA (Vertical Alignment) mode is used, polarity reversal drive (hereinafter also referred to as the DC-balanced drive) is used. This is for preventing a liquid crystal burn-in phenomenon where if a voltage is applied to a liquid crystal in a specific direction for a long time, the liquid crystal is ionized so that brightness adjustment by a voltage, which is intrinsic to the liquid crystal, becomes impossible to be made. In the DC-balanced drive, the voltage applied to the liquid crystal is alternately reversed in positive and negative directions, and a DC component of the voltage applied to the liquid crystal can be cancelled. Consequently, long-duration application of the voltage to the liquid crystal in a specific direction can be avoided and accordingly the DC-balanced drive is important from the viewpoint of reliability. Therefore, in a liquid crystal display device of the digital drive system, it is also necessary on a subframe basis to avoid applying a voltage to a liquid crystal in a specific direction for a subframe period or more, in order to prevent liquid crystal burn-in between a pixel electrode and a common electrode.

In the digital drive system, for example, one frame is divided into a plurality of subframes having a shorter display period than one frame period, and pixels are driven in a combination of subframes selected in accordance with a grayscale level to be displayed from the plurality of subframes (for example, see Japanese Laid-open Patent Publication No. 2006-171651). In the digital drive system, as described above, only information of "0" or "1" is applied to a pixel. In other words, that is only information whether to display black or white. Hence, it is necessary to generate grayscale levels by temporal integration. In the grayscale generation method described in Japanese Laid-open Patent Publication No. 2006-171651, one frame period is divided into a plurality of subframes, and periods during which the subframes can perform display are set to periods having a ratio of "1", "2", "4", "8", "16", "32", "32", "32", "32", "32", "32", and "32." For example, if a grayscale level of "100/255" is desired to be displayed, information, [001001110000], is written to a pixel in turn, and accordingly a subframe having a display period "4" and three subframes having a display period "32" are selected to represent the grayscale level of 100/255.

Moreover, known as the above liquid crystal display device of the digital drive system is one where each pixel includes two sample holding units connected in series, one voltage selection unit, and a liquid crystal display element. In the pixel, one-bit data held in the sample holding unit in a previous stage is transferred to a sample holding unit in a following stage at timing when a common signal is supplied via a common transfer signal line, and held therein. One of two types of voltages, V0 and V1, is selected at the voltage selection unit in accordance with the value of the held data, and applied to a pixel electrode of the liquid crystal display element. The liquid crystal display device including the pixel can collectively transfer a screenful of data to the sample holding unit in the following stage, and can also be applied to a three-dimensional image display device.

Moreover, a liquid crystal display device excluding the voltage selection unit from the configuration of the pixel and including a pixel where two latches are arranged in series is conventionally known as the liquid crystal display device of the digital drive system (for example, see Japanese Laid-open Patent Publication No. 2001-523847).

In recent years, with higher resolution and downsizing of liquid crystal display devices, pixels are further required to be downsized. Moreover, a demand for a three-dimensional image display device is becoming stronger, and a demand for a display device capable of rewriting a screen in one batch is also becoming stronger.

However, the known liquid crystal display device described in Japanese Laid-open Patent Publication No. 2001-523847 has a problem in the grayscale generation method. For example, data is transferred as schematically illustrated in (A) of FIG. 15 to perform display with each of the above-mentioned subframes, and a liquid crystal display element is driven for periods illustrated in (B) of FIG. 15. Accordingly, a data transfer suspension period that is not used for the transfer of data becomes long. Hence, the known liquid crystal display device described in Japanese Laid-open Patent Publication No. 2001-523847 has problems of very low efficiency and resulting cost increase.

Moreover, the known liquid crystal display device is capable of shortening the data transfer suspension period, but has a problem that a drive suspension period is required instead so that the display becomes dark. Moreover, there is also a problem that the downsizing of a pixel is difficult compared with the known liquid crystal display device described in Japanese Laid-open Patent Publication No. 2001-523847 since the voltage selection unit is included in a pixel.

SUMMARY OF THE INVENTION

It is an object of the present invention to at least partially solve the problems in the conventional technology.

According to an aspect of the present invention, a liquid crystal display device comprises: an image display unit including a plurality of pixels each having a liquid crystal element, the pixels being disposed at intersection portions where a plurality of column data lines intersect a plurality of row selection lines and being connected in common to a common signal line; a dithering process unit that outputs data after a dithering process where the dithering process has been performed on a video signal data supplied in a temporal or spatial direction to round the video signal data to a predetermined number of bits; a subframe data generation unit that generates subframe data of each of a plurality of subframes, the subframe data being values corresponding to pixel values of the data after the dithering process, from the data after the dithering process based on a drive grayscale table to include the plurality of subframes having a shorter display period than one frame period of the video signal data in each frame of the video signal data; a data inversion unit that reverses a polarity of the subframe data for each subframe period; an image display drive unit that sequentially supplies row selection signals to the plurality of row selection lines for each horizontal scanning period and supplies the row selection signals to all of the plurality of row selection lines in one frame period to sequentially select all of the plurality of pixels of the image display unit on a pixels-per-line basis, as well as repeats supplying to the plurality of column data lines the subframe data of one line of pixels outputted from the data inversion unit pixel by pixel and line by line to supply the subframe data outputted from the data inversion unit to all of the plurality of pixels of the image display unit and subsequently supply a common signal to the common signal line; and a common voltage selection unit that alternately selects a high-level common voltage and a low-level common voltage in each subframe period in synchronization with a polarity reversal operation by the data inversion unit, and applying the common voltage to a common electrode of the liquid crystal element, wherein the plurality of pixels each includes the liquid crystal element having a liquid crystal layer sealed between the common electrode and a pixel electrode, a first holding unit that, upon the row selection signal being supplied via the row selection line, samples and holds subframe data outputted from the data inversion unit and supplied by the image display unit via the column data line, a transfer unit that, upon the common signal being supplied via the common signal line, transfers the subframe data held by the first holding unit, and a second holding unit that holds the subframe data transferred by the transfer unit and applies the subframe data to the pixel electrode as a pixel voltage.

According to another aspect of the present invention, a method for driving a liquid crystal display device in which an image display unit includes a plurality of pixels disposed at intersection portions where a plurality of column data lines intersect a plurality of row selection lines and connected in common to a common signal line, the plurality of pixels each including a liquid crystal element having a liquid crystal layer sealed between a common electrode and a pixel electrode, a first holding unit that, upon a row selection signal being supplied via the row selection line, samples and holds subframe data outputted from a data inversion unit and supplied by the image display unit via the column data line, a transfer unit that, upon a common signal being supplied via the common signal line, transfers the subframe data held by the first holding unit, and a second holding unit that holds the subframe data transferred by the transfer unit and applies the subframe data to the pixel electrode as a pixel voltage, the method comprising: a dithering process step of outputting data after a dithering process where the dithering process has been performed on a video signal data supplied in a temporal or spatial direction to round the video signal data to a predetermined number of bits; a subframe data generation step of generating subframe data of each of a plurality of subframes, the subframe data being values corresponding to pixel values of the data after the dithering process, from the data after the dithering process based on a drive grayscale table to include the plurality of subframes having a shorter display period than one frame period of the video signal data in each frame of the video signal data; a data inversion step of reversing a polarity of the subframe data for each subframe period; an image display unit driving step of sequentially supplying the row selection signals to the plurality of row selection lines for each horizontal scanning period and supplying the row selection signals to all of the plurality of row selection lines in one frame period to sequentially select all of the plurality of pixels of the image display unit on a pixels-per-line basis, as well as repeating supplying to the plurality of column data lines the subframe data of one line of pixels processed in the data inversion step, pixel by pixel and line by line, to supply the subframe data processed in the polarity reversal step to all of the plurality of pixels of the image display unit and subsequently supply the common signal to the common signal line; and a common voltage selection step of alternately selecting a high-level common voltage and a low-level common voltage in each subframe period in synchronization with a polarity reversal operation in the polarity reversal step, and applying the common voltage to the common electrode of the liquid crystal element that is being driven in the image display unit driving step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a diagram illustrating an example of a drive grayscale table in FIG. 17;

FIG. 22 is a diagram illustrating an example of a drive table in FIG. 17; and

DETAILED DESCRIPTION OF THE PREFERRED EMBODIMENTS

Hereinafter, a liquid crystal display device and a method for driving the same in a first embodiment of the present invention will be described in detail with reference to the drawings. The present invention can also be applied to panel liquid crystal display devices such as an LCD including a display panel where a plurality of pixels is arranged in a matrix form, a plasma display panel display device (PDP), and a digital light processing display device (DLP). Hereinafter, a description will be given taking an example of a projection display device including an active matrix reflective liquid crystal display element as a display panel.

First Embodiment

Figure 1:
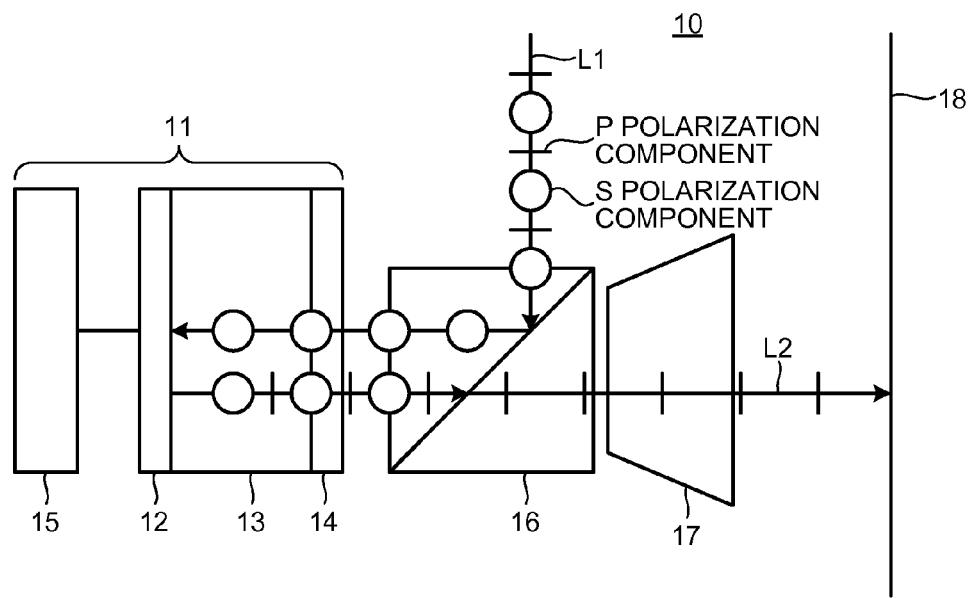
FIG. 1 is a schematic configuration diagram of a projection display device using a reflective liquid crystal display element.

FIG. 1 is a schematic configuration diagram of a projection display device using a reflective liquid crystal display element as an example of a liquid crystal display device. In FIG. 1, a projection display device 10 includes a reflective liquid crystal display element 11, a polarizing beam splitter (hereinafter referred to as "PBS") 16, and a projection lens 17. Outgoing light L2 emitted from the projection lens 17 is projected onto a screen 18.

The reflective liquid crystal display element 11 includes a plurality of pixel electrodes 12 each having conductivity and optical reflectivity, a liquid crystal layer 13, a common electrode (transparent electrode) 14 that is common to the plurality of pixel electrodes 12 and has conductivity and optical transparency, and a pixel circuit 15. The plurality of pixel electrodes 12 is disposed in a two-dimensional matrix form on a surface of a first substrate (not illustrated). In FIG. 1, only one arbitrary pixel electrode of the plurality of pixel electrodes 12 is illustrated. The common electrode 14 is formed on a surface of a second substrate (not illustrated). The liquid crystal layer 13 is sealed in a space between substrates formed by the first and second substrates being disposed away from each other so as to allow the pixel electrodes 12 to face the common electrode 14. Surfaces of the pixel electrodes 12 and the common electrode 14 are coated with alignment films (not illustrated).

In the projection display device 10, incident light L1 from a backlight or the like, which has been emitted from an unillustrated illumination optical system, enters the PBS 16. The incident light L1 includes an S polarization component and a P polarization component, the polarization planes of which are orthogonal to each other. In FIG. 1, the P polarization component is schematically illustrated by a segment, and the S polarization component by a circle. The PBS 16 has optical properties to reflect the S polarization component of incident light and transmit the P polarization component. Therefore, the PBS 16 reflects the S polarization component of the incident light L1 and allows the S polarization component to enter the common electrode 14.

The reflective liquid crystal display element 11 allows the S polarization component incident on the common electrode 14 to enter the pixel electrode 12 via the liquid crystal layer 13 to reflect the S polarization component, and further emits the reflected light from the pixel electrode 12 through both of the liquid crystal layer 13 and the common electrode 14. Here, the reflective liquid crystal display element 11 modulates the S polarization component incident on the common electrode 14 depending on a potential difference between a drive voltage applied to the pixel electrode 12 in accordance with pixel data and a common voltage applied to the common electrode 14, in the above process until the S polarization component incident on the common electrode 14 is reflected by the pixel electrode 12 and emitted from the common electrode 14. Consequently, part of the S polarization component is converted into the P polarization component, and the light composed of the S and P polarization components is emitted.

The PBS 16 transmits the P polarization component of the light emitted from the reflective liquid crystal display element 11 to allow the P polarization component to enter the projection lens 17, and reflects the S polarization component to allow the S polarization component to enter the illumination optical system. The projection lens 17 projects the P polarization component from the PBS 16 onto the screen 18 as outgoing light L2 to display an image. The "intensity of output light," which is described below, indicates the luminance of the outgoing light L2 measured on the screen 18.

Figure 2:
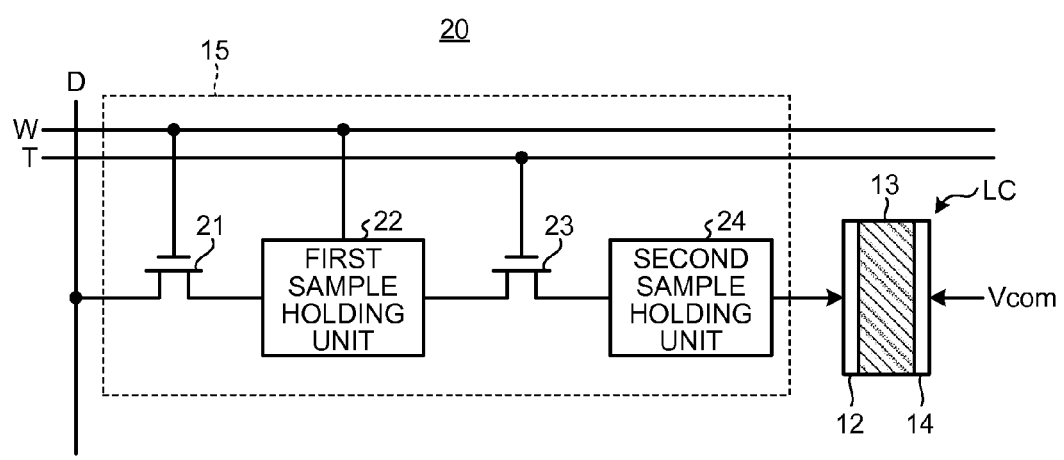
FIG. 2 is a configuration diagram of a pixel of one mode of a liquid crystal display device of the present invention.

FIG. 2 is a configuration diagram of a pixel of one mode of a liquid crystal display device according to the present invention. In FIG. 2, the same reference numerals are assigned to the same configuration parts as FIG. 1. In FIG. 2, one pixel 20 of one mode of the liquid crystal display device according to the present invention includes the pixel circuit 15 and a liquid crystal element LC, and is disposed in an intersection portion of one column data line D and one row selection line W. The liquid crystal element LC may have a known configuration. In other words, the liquid crystal layer 13 is sealed in the space between substrates formed by the first and second substrates being disposed away from each other so as to allow the pixel electrode 12 formed on the first substrate, the pixel electrode 12 having optical reflectivity, to face the common electrode 14 formed on the second substrate, the common electrode 14 having optical transparency properties. One pixel 20 in FIG. 2 corresponds to one pixel of the reflective liquid crystal display element 11 illustrated in FIG. 1.

As illustrated in FIG. 2, the pixel circuit 15 includes a first switching unit 21, a first sample holding unit 22, a second switching unit 23, and a second sample holding unit 24. The first switching unit 21 is configured of an N-channel MOS field-effect transistor (hereinafter referred to as NMOS transistor) having a drain connected to the column data line D, a gate connected to the row selection line W, and a source connected to an input terminal of the first sample holding unit 22.

In the present invention, the configuration including the first switching unit 21 and the first sample holding unit 22 is defined as a first holding unit, the second switching unit 23 as a transfer unit, and the second sample holding unit 24 as a second holding unit.

The first sample holding unit 22 is configured of a flip-flop with an SRAM (Static Random Access Memory) structure, and is connected to the row selection line W as well as is connected to the column data line D via the first switching unit 21. The first sample holding unit 22 samples and holds subframe data (a pixel data voltage) on the column data line D, which is inputted through the first switching unit 21 when the pixel 20 is selected by a row selection signal applied via the row selection line W.

The second switching unit 23 is configured of an NMOS transistor having a drain connected to an output terminal of the first sample holding unit 22, a gate connected to a common signal line T, and a source connected to an input terminal of the second sample holding unit 24. The second switching unit 23 is activated when a signal for transfer at H level is applied via the common signal line T, and transfers to the second sample holding unit 24 the subframe data (the pixel data voltage) held by the first sample holding unit 22.

The second sample holding unit 24 is configured of a flip-flop with the SRAM structure, samples and holds the subframe data (the pixel data voltage) inputted via the second switching unit 23, and applies the subframe data to the pixel electrode 12 of the liquid crystal element LC. A voltage to be applied by the second sample holding unit 24 to the pixel electrode 12 is Vss being a ground voltage of the MOS transistor when data held is "0," and is Vdd being a power supply voltage of the MOS transistor when data is "1." The value of a voltage of the common electrode 14 of the liquid crystal element LC is called a common voltage Vcom.

Figure 3A:
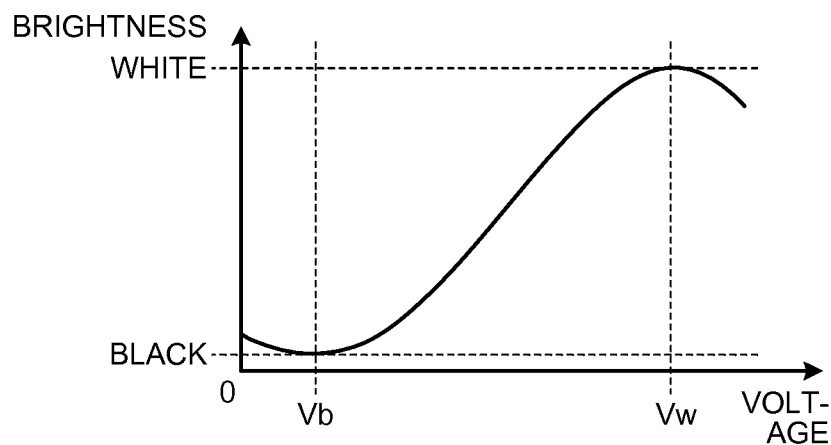
FIGS. 3A and 3B are explanatory views of an example of a method for setting Vdd and Vcom of a reflective liquid crystal display element in a first embodiment of the present invention.
Figure 3B:
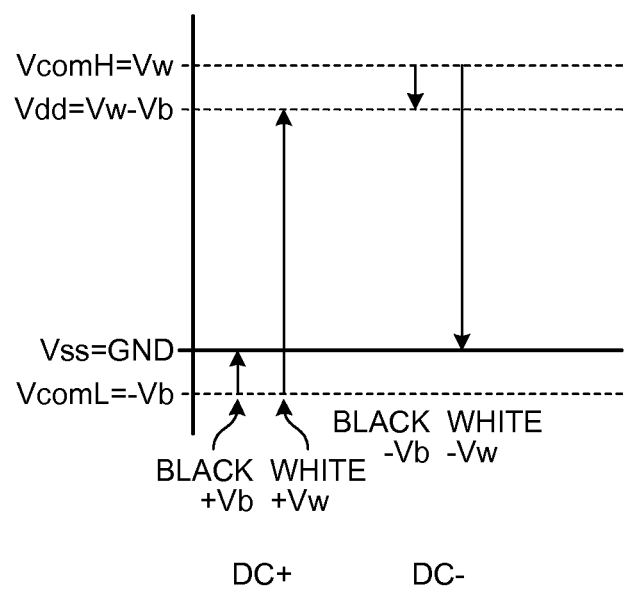

FIGS. 3A and 3B illustrate explanatory views of an example of a method for setting Vdd and Vcom of the reflective liquid crystal display element 11. FIG. 3A is an example illustrating a relationship between an input voltage and the intensity (brightness) of output light. In FIG. 3A, the horizontal axis represents the input voltage, and indicates a potential difference between the pixel electrode 12 and the common electrode 14, that is, a drive voltage of the liquid crystal layer 13. Moreover, the vertical axis of FIG. 3A represents the intensity of output light emitted from the liquid crystal layer 13. A voltage when the intensity of the output light emitted from the liquid crystal layer 13 is the lowest is defined as Vb (a black voltage), and a voltage at which the intensity of the output light saturates as Vw (a white voltage).

FIG. 3B illustrates a diagram illustrating the operation upon polarity reversal during white/black driving. As described above, the liquid crystal display device needs to perform the polarity reversal drive (DC-balanced drive) in order to prevent liquid crystal burn-in. As illustrated in FIG. 3B, (Vw−Vb) is set to the power supply voltage Vdd of the pixel circuit, and GND is set to Vss. Moreover, −Vb and Vw are respectively set to the low-level VcomL and the high-level VcomH of the common voltage Vcom.

As illustrated in FIG. 3B, when the polarity of a liquid crystal applied voltage where the common voltage is subtracted from the pixel electrode voltage is + (DC+), −Vb being the low-level VcomL is applied to the common voltage Vcom. At this point, if "0" is held by the second sample holding unit 24, Vb (=Vss−VcomL=0−(−Vb)) is applied to the liquid crystal layer 13 to display black. Moreover, in the case of DC+, if "1" is held by the second sample holding unit 24, Vw (=Vdd−VcomL=(Vw−Vb)−(−Vb)) is applied to the liquid crystal layer 13 to display white.

On the other hand, the polarity of the liquid crystal applied voltage where the common voltage is subtracted from the pixel electrode voltage is − (DC−), Vw being the high-level VcomH is applied to the common voltage Vcom. At this point, if "0" is held by the second sample holding unit 24, −Vw (=Vss−VcomH=0−Vw) is applied to the liquid crystal layer 13 to display white. Moreover, in the case of DC−, if "1" is held by the second sample holding unit 24, −Vb (=Vdd−VcomH=(Vw−Vb)−Vw) is applied to the liquid crystal layer 13 to display black.

Next, a description will be given of the configuration of the liquid crystal display device in the first embodiment.

Figure 4:
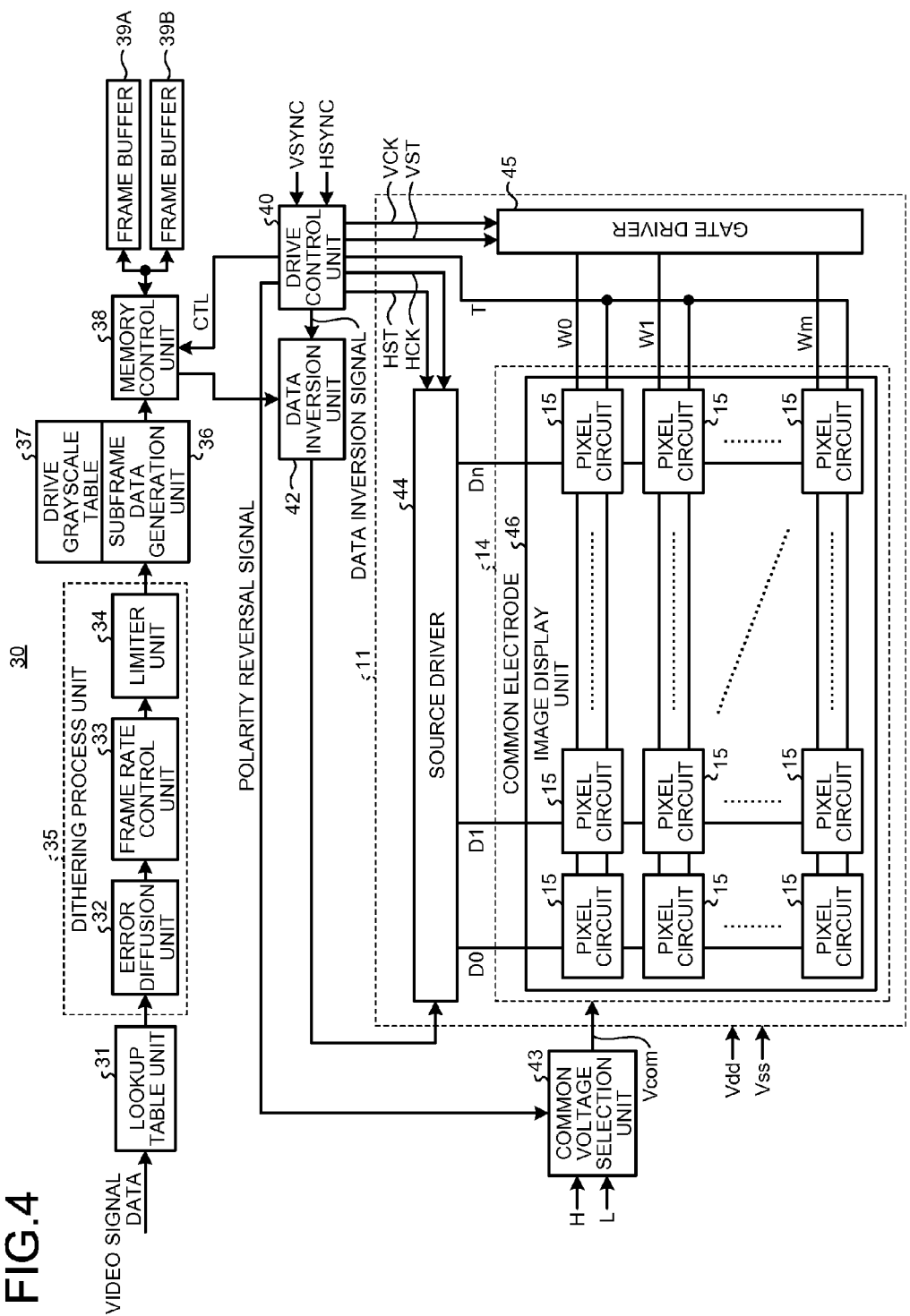
FIG. 4 is a block diagram of one mode of a liquid crystal display device in the first embodiment of the present invention.

FIG. 4 illustrates a block diagram of one mode of a liquid crystal display device in the first embodiment of the present invention. In FIG. 4, the same reference numerals are assigned to the same configuration parts as FIGS. 1 and 2. As illustrated in FIG. 4, a liquid crystal display device 30 of the embodiment includes a lookup table unit 31, a dithering process unit 35 having an error diffusion unit 32, a frame rate control unit 33, and a limiter unit 34, a subframe data generation unit 36 provided with a drive grayscale table 37, a memory control unit 38, frame buffers 39A and 39B with a double buffer configuration, a drive control unit 40, a data transfer unit (not illustrated), a data inversion unit 42, and a common voltage selection unit 43. Furthermore, the liquid crystal display device 30 includes the reflective liquid crystal display element 11 illustrated in FIG. 1.

In FIG. 4, the reflective liquid crystal display element 11 includes a source driver 44, a gate driver 45, and an image display unit 46. The pixel 20 of the reflective liquid crystal display element 11 has a configuration where the liquid crystal element LC is connected to the pixel circuit 15 as illustrated in FIG. 2. However, in FIG. 4, only the common electrode 14 is illustrated and the illustrations of the pixel electrodes 12 respectively connected to the pixel circuits 15 and of the liquid crystal layer 13 are omitted. In the present invention, a configuration where the source driver 44 and the gate driver 45 are added to the drive control unit 40 is defined as an image display control unit.

The image display unit 46 includes the pixel circuits 15 respectively connected to the intersection portions where n+1 column data lines D0 to Dn extending in the vertical direction of the screen intersect m+1 row selection lines W0 to Wm extending in the horizontal direction of the screen. A total of the (n+1)×(m+1) pixel circuits 15 as a whole is disposed in a matrix form in the image display unit 46, each of the pixel circuits 15 having the configuration illustrated in FIG. 2. Moreover, all the pixel circuits 15 constituting the image display unit 46 configure the pixels 20, respectively, by being connected to the liquid crystal elements LC. The common voltage Vcom is applied from the common voltage selection unit 43 to the common electrode 14 of the liquid crystal element LC. Moreover, the pixel circuits 15 are connected in common to the common signal line T.

The source driver 44 repeats, for every one-horizontal scanning period (1H), applying one line of pixels of subframe data inputted and outputting the one line of pixels of subframe data respectively to the column data lines D0 to Dn. The gate driver 45 switches between more than one of the row selection lines W connected to each pixel circuit 15 of each row, for example, in a direction from the row selection line at the top of the screen to the row selection line at the bottom of the screen, and supplies a row selection signal, line by line, for every 1H. The row selection signals are supplied to all the row selection lines W in one frame period. The row selection signal is in synchronization with a switching cycle of subframe data to be outputted from the source driver 44 to the column data lines D0 to Dn.

Next, the configuration and operation of the liquid crystal display device 30 of the embodiment will be described using FIG. 5 that describes the number of bits (grayscale representation) of output signals of the blocks of the main parts of FIG. 4, and the like. In FIG. 4, the lookup table unit 31 receives N-bit video signal data as an input signal, and converts the video signal data into data of (M+F+D) bits larger than N. Here, M represents the number of bits when the number of subframes for one frame period is expressed in a binary number, F represents the number of bits interpolated by the frame rate control unit 33, and D represents the number of bits interpolated by the error diffusion unit 32. M, F, and D are respectively natural numbers.

Figure 5:
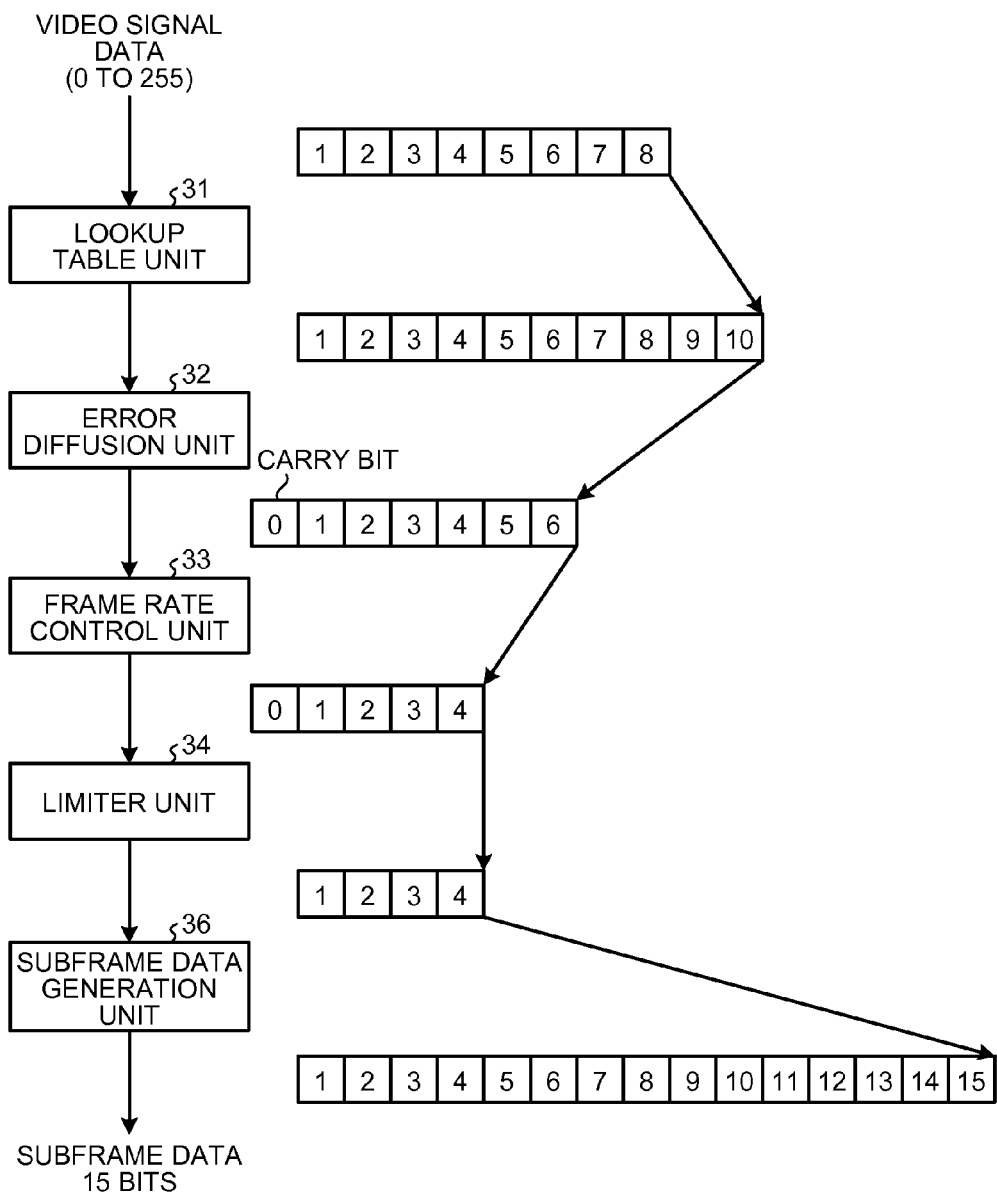
FIG. 5 is a diagram illustrating an example of a grayscale representation in blocks of main components of FIG. 4.

FIG. 5 is an example of a case where the number of bits N of the input video signal data is set to "eight." It is assumed that the number of bits D interpolated by the error diffusion unit 32 is "four," and the number of bits F interpolated by the frame rate control unit 33 is "two." Moreover, it is assumed that the number of bits M when the number of subframes is expressed in a binary number is "four," and the number of drive grayscale levels is 15 (not including black).

Here, the operation of the lookup table unit 31 will be described. Generally, gamma correction is performed on a video signal. The image display device side needs to return to linear grayscale by performing an inverse gamma correction process on the gamma-corrected video signal. Inverse gamma correction is correction to have an output, corresponding to an input X, that is equal to X to the power of 2.2. In this case, the output characteristics are hereinafter expressed to be "gamma 2.2." The lookup table unit 31 serves as a function to realize the liquid crystal display device 30 that has output characteristics of gamma 2.2 by converting the input/output characteristics of the reflective liquid crystal display element 11.

Figures 6, 7:
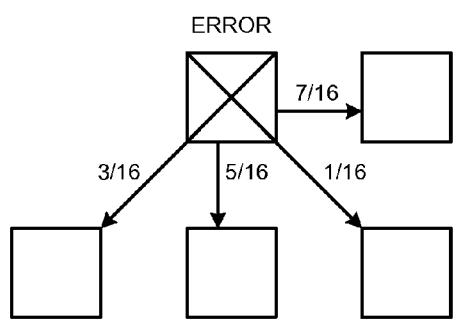
FIG. 6 is a diagram illustrating an example of a drive grayscale table in FIG. 4.
FIG. 7 is a diagram illustrating an example of the operation of an error diffusion unit in FIG. 4.

The lookup table unit 31 is previously adjusted such that a 10-bit output has arbitrary output characteristics (for example, gamma 2.2). For example, images by the driving at each of the 15 drive grayscale levels (not including black) in the drive grayscale table 37 of FIG. 6 are projected onto the screen 18 in the projection display device 10 illustrated in FIG. 1. The luminance on the screen 18 at that time for each image is measured by a light meter or the like. The luminance between each of the drive grayscale levels is linearly interpolated by six bits (M+D=6) (64 grayscale levels) and accordingly luminance data for each of 0 to 960 grayscale levels is predicted. The lookup table unit 31 is assumed to select 256 data that has arbitrary output characteristics (for example, gamma 2.2) from these luminance data, and previously hold the data as a lookup table.

The lookup table unit 31 includes the lookup table of 256× 10 bits (that is, "two to the eighth power" grayscale levels× (4+2+4) bits). Here, "two to the eighth power" grayscale levels×(4+2+4) bits corresponds to "two to the N-th power" grayscale levels×(M+F+D) bits where the values of N=8, M=4, F=2, and D=4 are substituted. The lookup table unit 31 converts inputted eight-bit image data into 10-bit data to output the data.

Returning to FIG. 4, a description will be given. The error diffusion unit 32 diffuses to neighboring pixels lower D-bit information of the video signal data converted by the lookup table unit 31 into (M+F+D) bits, pursuant to an error diffusion method, to convert the information into data of (M+F) bits. In the example of FIG. 5, the error diffusion unit 32 diffuses to neighboring pixels lower four-bit information of the 10-bit data converted by the lookup table unit 31, quantizes the information to upper six-bit data, and outputs the data. The output data of the error diffusion unit 32 includes one carry bit and the six-bit data.

Here, the error diffusion method is a method for complementing the lack of grayscale by diffusing to neighboring pixels an error (display error) between a video signal to be displayed and an actual display value. In the embodiment, the error diffusion unit 32 performs error diffusion by regarding the value of lower 4 bits of a focused pixel of a video signal to be displayed as a display error, and adding a 7/16-times value of the display error to a pixel on the right of the focused pixel, a 3/16-times value of the display error to a pixel on the lower left, a 5/16-times value of the display error to a pixel immediately below, and a 1/16-times value of the display error to a pixel on the lower right, respectively, as illustrated in FIG. 7.

Figure 8:
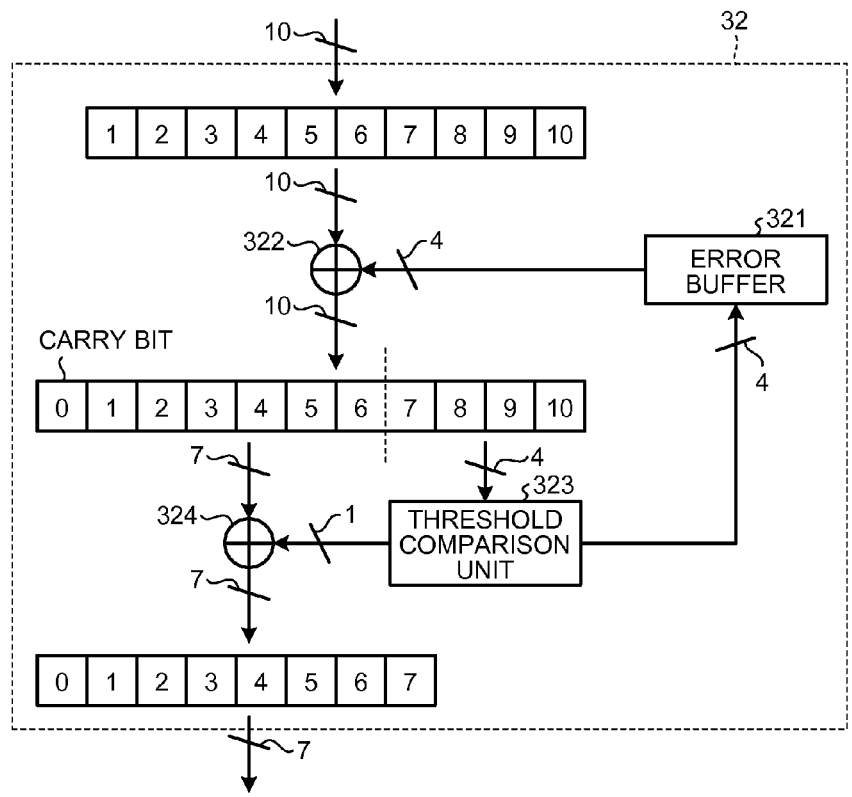
FIG. 8 is a configuration diagram of an example of the error diffusion unit in FIG. 4.

The configuration and operation of the error diffusion unit 32 will be described in more detail using FIG. 8. The error diffusion unit 32 diffuses to neighboring pixels a display error of a pixel at certain coordinates where there is the 10-bit video signal data as described with FIG. 7, and adds the display error to an error diffused by the neighboring pixel. In other words, in FIG. 8, the inputted 10-bit video signal data is first added in an addition unit 322 to the error diffused from the neighboring pixel and read from an error buffer 321.

The addition unit 322 generates 11-bit data where one carry bit is added to the 10-bit data after addition in the most significant bit location, considering a carry upon addition. Next, the video signal data after addition outputted from the addition unit 322 is divided into upper seven bits and lower four bits. The upper seven bits are supplied to an addition unit 324. The lower four bits are supplied to a threshold comparison unit 323.

The values of the divided lower four bits are illustrated below. The values on the right are display errors.

| Lower 4 Bits | Display Error |
| --- | --- |
| 0000 | 0 |
| 0001 | +1 |
| 0010 | +2 |
| 0011 | +3 |
| 0100 | +4 |
| 0101 | +5 |
| 0110 | +6 |
| 0111 | +7 |
| 1000 | −7 |
| 1001 | −6 |
| 1010 | −5 |
| 1011 | −4 |
| 1100 | −3 |
| 1101 | −2 |
| 1110 | −1 |
| 1111 | 0 |

The threshold comparison unit 323 supplies a display error corresponding to the value of the divided lower four bits to the error buffer 321 to diffuse the error to neighboring pixels, pursuant to FIG. 7, add the error to a previous display error, and hold it. Moreover, the threshold comparison unit 323 makes a threshold comparison for the value of the divided lower four bits. If the value of the divided lower four bits is consequently larger than "1000" (the value representing a negative display error indicated in the line below the line where the value of four bits in the above table is "1000"), the threshold comparison unit 323 outputs "1" to the addition unit 324 to add "1" to the value of the divided upper seven bits. The addition unit 324 generates seven-bit data, and outputs the data as data after error diffusion by the error diffusion unit 32.

Returning to FIG. 4 again, a description will be given. The frame rate control unit 33 includes a frame rate control table, and converts the video signal data after error diffusion converted into (M+F)+1 bits and supplied from the error diffusion unit 32 into data of M+1 bits, pursuant to a frame control method. Here, the frame control method is a method for displaying pseudo grayscale in a temporal direction by setting j (j:j≥2, natural number) frames as one cycle for the display of one pixel of a display element to perform on-display in k (j:k>0, j>k, natural number) frames in the cycle, and to perform off-display in the remaining (j−k) frames, and simultaneously displaying pseudo grayscale in a spatial direction by setting j (j:k>2, natural number) pixels as one group for a plurality of pixels of the display element to perform on-display in k (j:k>0, j>k, natural number) pixels out of j pixels, and to perform off-display in the remaining (j−k) pixels.

In other words, the frame rate control unit 33 identifies the location in the frame rate control table from the value of lower F bits of the video signal data after error diffusion to be inputted, and pixel location information and frame count information, adds the value (the value of "1" or "0", hereinafter described as "0/1") to upper (M+1) bits of the video signal data after error diffusion to be inputted, and converts the data to data of (M+1) bits.

In the example of FIG. 5, the frame rate control unit 33 derives a value of 0/1 from the frame rate control table based on lower two-bit information of the seven-bit video signal data after error diffusion outputted from the error diffusion unit 32, and the location information of a target pixel in a display area and frame counter information, and adds the value to the value of upper five bits separated from the inputted seven-bit video signal data after error diffusion.

Figure 9:
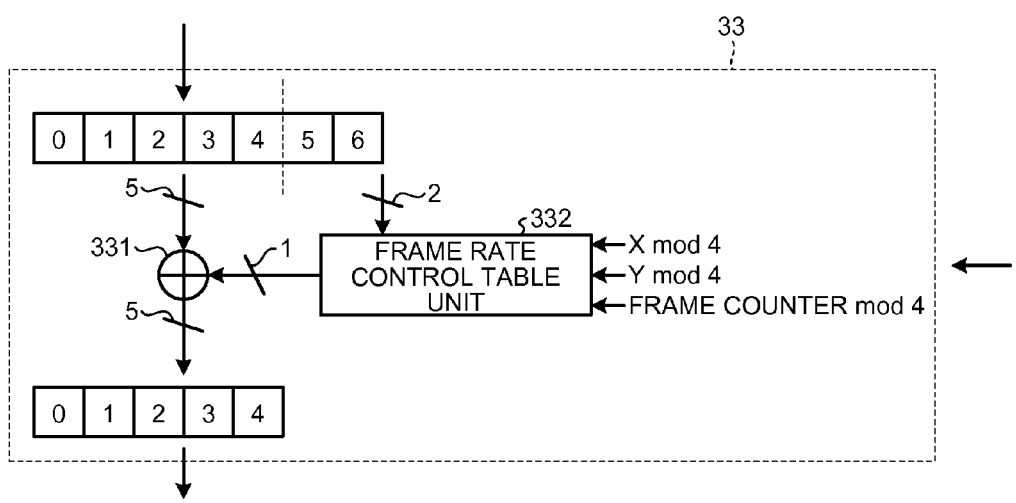
FIG. 9 is a configuration diagram of an example of a frame rate control unit in FIG. 4.

The configuration and operation of the frame rate control unit 33 will be described in more detail using FIGS. 9 and 10. In FIG. 9, firstly, the frame rate control unit 33 divides the inputted seven-bit video signal data after error diffusion into upper five bits and lower two bits, and supplies the upper five-bit data to an addition unit 331 and the lower two-bit data to a frame rate control table unit 332.

Figure 10:
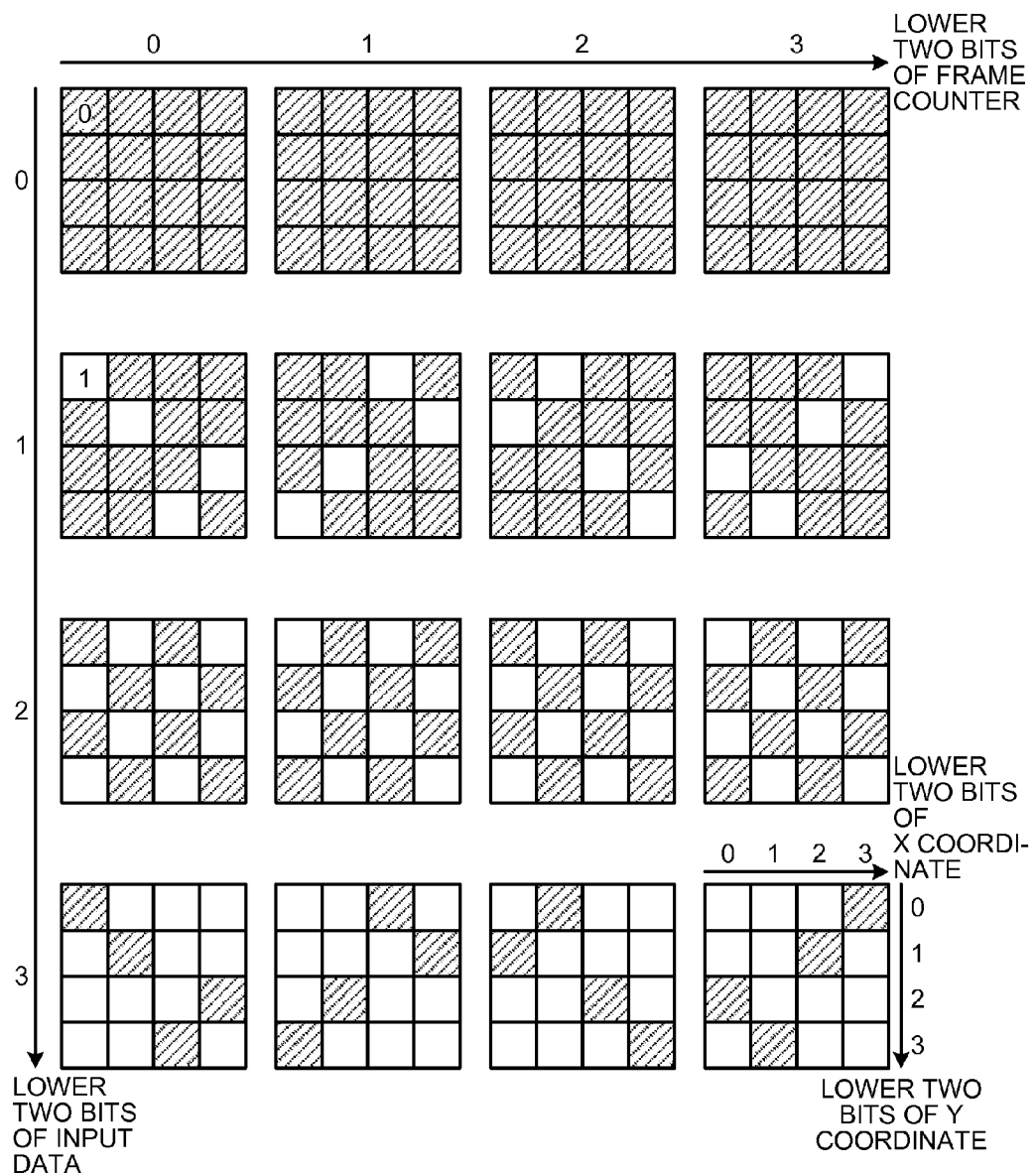
FIG. 10 is a diagram illustrating a frame control table used by the frame rate control unit in FIG. 4.

The frame rate control table unit 332 uses a value of a total of eight bits, which are the lower two bits of the inputted seven-bit video signal data after error diffusion, location information on which partitioned area includes a target pixel when a display area is divided into four in the vertical direction and four in the horizontal direction, 16 in total (in other words, lower two bits of an X coordinate and lower two bits of a Y coordinate, which are coordinate data), and lower two bits of a frame counter, to identify a value "0" or "1" indicated by the frame rate control table of FIG. 10. If the coordination location of the target pixel is, for example, (124, 367), their respective lower two bits are (00, 11), and the above location information is the value of the location of lower two bits "0" of the X coordinate and lower two bits "3" of the Y coordinate in FIG. 10. In FIG. 10, the "lower two bits" in the vertical direction indicates lower two bits of the inputted seven-bit data, and the "lower two bits" in the horizontal direction indicates lower two bits of the frame counter.

The addition unit 331 adds the value of "0" or "1" identified by the frame rate control table unit 332 to the upper five-bit data of the inputted seven-bit video signal data after error diffusion, and outputs the five-bit data after addition as output data of the frame rate control unit 33.

The limiter unit 34 illustrated in FIGS. 4 and 5 limits the value of the five-bit data outputted from the frame rate control unit 33 to, for example, "15" being a maximum value of drive grayscale, and outputs the limited four-bit data to the subframe data generation unit 36. Here, the error diffusion unit 32, the frame rate control unit 33, and the limiter unit 34 configure the dithering process unit 35 as illustrated in FIG. 4, and generate four-bit data where grayscale is interpolated by performing a visual psychological computation, what is called a dithering process, in the temporal or spatial direction on 10-bit video signal data after grayscale interpolation supplied by the above operation from the lookup table unit 31. Consequently, improvement in image quality can be achieved.

The subframe data generation unit 36 illustrated in FIG. 4 uses the drive grayscale table 37 to be described below, and converts the four-bit data outputted from the limiter unit 34 into, for example, 15-bit data indicating the maximum grayscale level, "15," as illustrated in FIG. 5. The 15-bit data is data composed of 15 one-bit subframe data indicating whether or not a target pixel performs display in a subframe assigned in accordance with a bit position out of 15 subframes each having a display period where one frame period is divided into 15.

FIG. 6 illustrates a specific example of the drive grayscale table 37 used by the subframe data generation unit 36. In FIG. 6, the horizontal axis represents data values respectively in subframes SF1 to SF15 (a driving period if 1 and a blanking period if 0), and the vertical axis represents grayscale levels. The grayscale of the vertical axis represents a grayscale generated by the frame rate control unit 33 and limited by the limiter unit 34 to "15" being the maximum value of drive grayscale. The drive grayscale table 37 illustrated in FIG. 6 represents the drive grayscale table 37 when dividing one frame of a video signal into the 15 subframes SF1 to SF15 each having a shorter display period than one frame period and displaying 16 grayscale levels from level 0 to level 15. SF 1 to SF15 indicate the order of the subframes in one frame.

As illustrated in FIG. 6, the drive grayscale table 37 is set such that if a grayscale level to be displayed increases, the number of the subframes to be driven increases sequentially from SF1. For example, if the grayscale level is "six," six subframes from the subframes SF1 to SF6 are driven, and eight subframes from the subframes SF7 to SF14 are not driven. Moreover, if the grayscale level is "seven," seven subframes from the subframes SF1 to SF7 are driven, and seven subframes from the subframes SF8 to SF14 are not driven. From then onwards, in a similar manner, the number of subframes to fall in a driving state increases with increase in the level of grayscale, and all the subframes SF1 to SF15 are driven at the maximum grayscale level "15." In other words, the number of subframes to fall in the driving state increases temporally backward with increase in the level of grayscale.

The subframe data generation unit 36 acquires one-bit subframe data respectively in the subframes SF1 to SF15, using the drive grayscale table 37 illustrated in FIG. 6, in accordance with the grayscale level indicated by the four-bit data supplied from the dithering process unit 35, and outputs the data of 15 bits in total to the memory control unit 38. For example, if the four-bit data on which the dithering process has been performed is [0110], the subframe data generation unit 36 converts the four-bit input data into a decimal number, and refers to the drive grayscale table 37 of FIG. 6 to convert the grayscale level "six" indicated by the decimal number into data [111111000000000] of 15 bits in total, which indicates whether to be driven respectively in SF1 to SF15. The value "1" from the first bit to the sixth bit of the 15-bit data indicates to be driven in SF1 to SF6, and "0" from the seventh to 15th bits indicates to be not driven in SF7 to SF15.

Returning to FIG. 4 again, a description will be given. The memory control unit 38 supplies to the two frame buffers 39A and 39B, for example, 15 subframe data supplied from the subframe data generation unit 36. The frame buffers 39A and 39B have a double buffer structure. While one of the frame buffers is storing subframe data, subframe data stored in the other frame buffer is transferred via the data inversion unit 42. Moreover, in the next frame, the subframe data of the one of the frame buffers stored during the previous frame period is transferred via the data inversion unit 42, and subframe data from the subframe data generation unit 36 is stored in the other frame buffer. These operations are executed alternately.

The drive control unit 40 is supplied with a vertical synchronization signal VSYNC and a horizontal synchronization signal HSYNC of video signal data that is supplied to the lookup table unit 31, controls timings of processes for each subframe, and the like in synchronization with the synchronization signals. The drive control unit 40 instructs the data inversion unit 42 to transfer, and controls the gate driver 45. The data inversion unit 42 instructs the memory control unit 38 on the transfer instruction of the drive control unit 40, and receives specified subframe data among subframe data read by the memory control unit 38 from the frame buffer 39A or 39B. Moreover, the data inversion unit 42 reverses the polarity (reverses the polarity to "1" if "0" and to "0" if "1") of the input subframe data, in accordance with a data inversion signal from the drive control unit 40, if the data inversion signal is at low level, and transfers the subframe data to the source driver 44.

The source driver 44 simultaneously transfers one-bit subframe data of one line of pixels in the same subframe to the pixel circuits 15 of corresponding pixels of the image display unit 46 using the column data lines D0 to Dn whenever receiving the one-bit subframe data from the data inversion unit 42. At this point, the gate driver 45 activates a row selection line Wy of a row y specified by a vertical start signal (VST)/a vertical shift clock signal (VCK) from the drive control unit 40, and selects (n+1) pixels of all columns of the specified row y. The first switching units 21 of the pixel circuits 15 of the pixels of the selected row y are activated, and the pixel circuit 15 samples the subframe data supplied via the connected column data line among one line of the (n+1) subframe data inputted in parallel from the source driver 44 via the column data lines D0 to Dn, and holds the per-pixel subframe data in the first sample holding unit 22.

As described above, the common voltage selection unit 43 selects the low-level VcomL for a period during which the polarity of an applied voltage to the liquid crystal element LC of the pixel 20 is +, and selects the common voltage Vcom of the high-level VcomH for a period during which the polarity is −, in accordance with the polarity reversal signal from the drive control unit 40, and outputs the voltage to the common electrode 14 of all the pixels 20.

Whenever the above operation is repeated on a line-by-line basis, and the transfer and holding of one subframe data to and in the first sample holding units 22 in the pixel circuits 15 of all the lines of the image display unit 46 are complete, the drive control unit 40 outputs a signal for transfer to the common signal lines T, and simultaneously activates the second switching units 23 in the pixel circuits 15 of all the lines. Moreover, the one subframe data held by the first sample holding units 22 is collectively transferred to the second sample holding units 24 to be sampled and held. The subframe data held by the second sample holding unit 24 and applied to the pixel electrode 12 has a value of "1" or "0" in accordance with the grayscale level to be displayed in the pixel.

Next, a description will be given of a drive pattern of the liquid crystal display device 30 of the embodiment.

Figure 11:
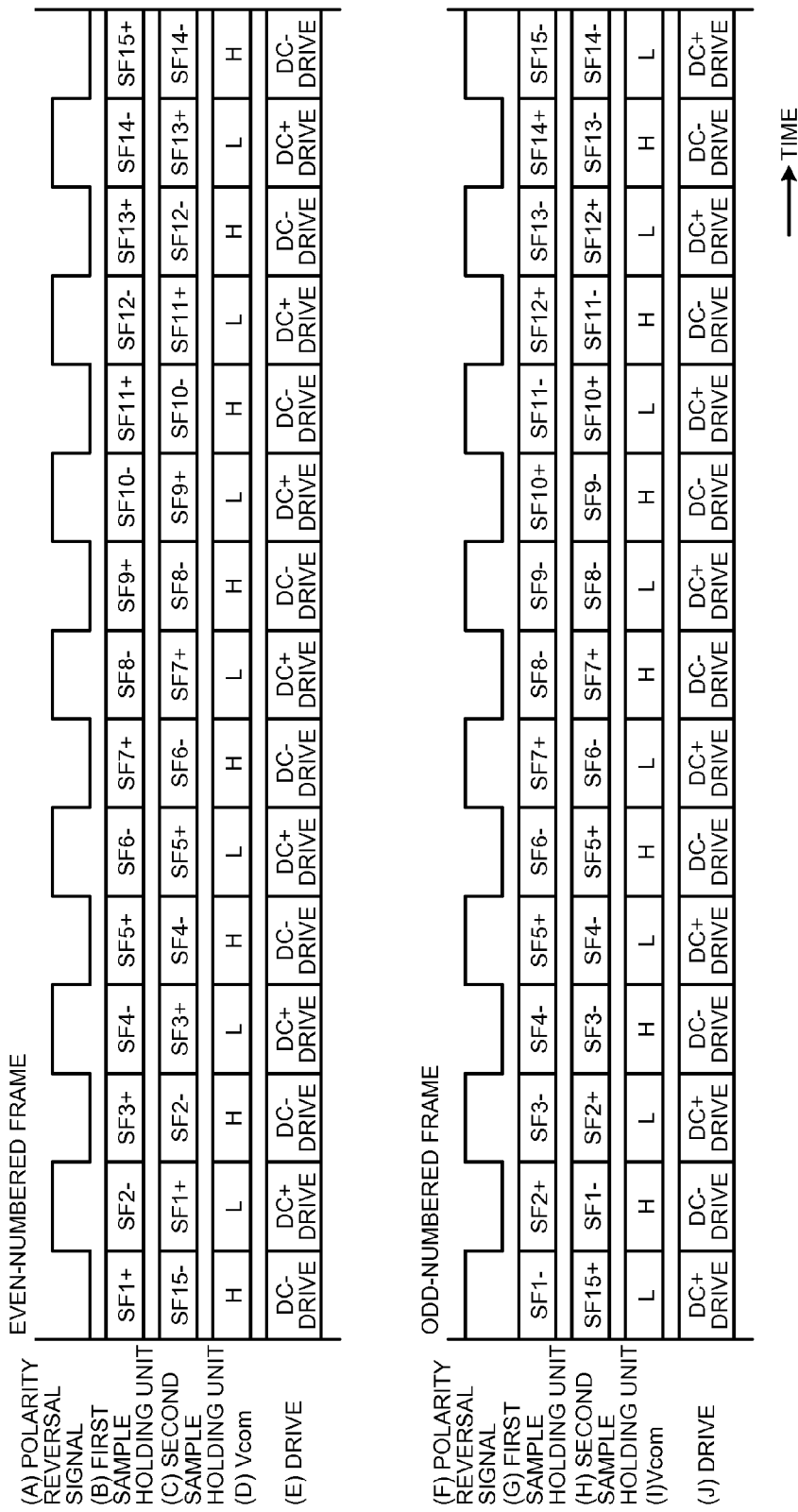
FIG. 11 is an explanatory view of an example of a drive pattern of the liquid crystal display device in the first embodiment of the present invention.

FIG. 11 illustrates an explanatory view of an example of a drive pattern in one mode of the liquid crystal display device according to the present invention. FIG. 11 illustrates a drive pattern of the case where the number of subframes for one frame period is 15. In FIG. 11, (A) illustrates a polarity reversal signal in an even-numbered frame. In FIG. 11, (F) illustrates a polarity reversal signal in an odd-numbered frame. As illustrated in (A) and (F) of FIG. 11, the polarity reversal signal supplied to the data inversion unit 42 and the common voltage selection unit 43 is reversed in each subframe, and the order is reversed in the even-numbered frames and the odd-numbered frames.

In FIG. 11, (B) illustrates the state of even-numbered frame data written to the first sample holding unit 22. In FIG. 11, (G) illustrates the state of odd-numbered frame data written to the first sample holding unit 22. In (B) of FIG. 11, for example, "SF1+" indicates that the first subframe data is being held by the first sample holding unit 22 without the data being inverted by the data inversion unit 42 for positive polarity drive. Moreover, "SF2−" in (B) of FIG. 11 indicates that the second subframe data has been inverted by the data inversion unit 42 for negative polarity drive and is being held by the first sample holding unit 22. Similarly, for example, "SF1−" in (G) of FIG. 11 indicates that the first subframe data has been inverted by the data inversion unit 42 for negative polarity drive and is being held by the first sample holding unit 22. Moreover, "SF2+" in (G) of FIG. 11 indicates that the second subframe data is being held by the first sample holding unit 22 without the data being inverted by the data inversion unit 42 for positive polarity drive. As can be seen from (B) and (G) of FIG. 11, the data of the first to fifteenth subframes SF1 to SF15 held by the first sample holding unit 22 on a subframe-by-subframe basis is inverted in each subframe.

In FIG. 11, (C) illustrates the state of even-numbered frame data written to the second sample holding unit 24, and (H) illustrates the state of odd-numbered frame data written to the second sample holding unit 24. As can be seen from (C) and (H) of FIG. 11, the data of the first to fifteenth subframes SF1 to SF15 held by the second sample holding unit 24 on a subframe-by-subframe basis are held lagging one subframe behind the data of the first to fifteenth subframes SF1 to SF15 held by the first sample holding unit 22.

In FIG. 11, (D) illustrates the polarity of the common voltage Vcom upon the input of a video signal of an even-numbered frame. In FIG. 11, (I) illustrates the polarity of the common voltage Vcom upon the input of a video signal of an odd-numbered frame. In (D) and (I) of FIG. 11, "H" indicates that the common voltage Vcom is the high-level VcomH, and "L" indicates that the common voltage Vcom is the low-level VcomL. Moreover, as can be seen from (D) and (I) of FIG. 11, the polarity of the common voltage, in synchronization with the polarity reversal signal, is VcomH when the polarity reversal signal is at low level, and is VcomL when the polarity reversal signal is at high level, and the order is reversed in the even-numbered frames and the odd-numbered frames. In other words, when the polarity reversal signal is at high level, the data is inverted, and VcomL is applied to the common electrode. Moreover, when the polarity reversal signal is at low level, the data is not inverted, and VcomH is applied to the common electrode. The above operation may be set as a drive pattern where when the polarity reversal signal is at high level, the data is not inverted, and VcomH is applied to the common electrode, and when the polarity reversal signal is at low level, the data is inverted, and VcomL is applied to the common electrode.

In FIG. 11, (E) illustrates the driving state of the liquid crystal element LC upon the display of a video signal of an even-numbered frame. In FIG. 11, (J) illustrates the driving state of the liquid crystal element LC upon the display of a video signal of an odd-numbered frame. In (E) and (J) of FIG. 11, "DC+" indicates a driving period to drive setting the polarity of a liquid crystal applied voltage to +, and "DC−" indicates a driving period to drive setting the polarity of a liquid crystal applied voltage to −. Moreover, as can be seen from (E) and (J) of FIG. 11, the driving polarity is + when the common voltage is VcomL, and is − when the common voltage is VcomH, and the order is reversed in the even-numbered frames and the odd-numbered frames.

In this manner, in the liquid crystal display device 30 of the embodiment, the driving polarity is reversed in each subframe in the same frame, and the liquid crystal element LC is AC-driven. Accordingly, burn-in of the liquid crystal layer 13 can be prevented. Furthermore, the driving polarity is reversed also in each frame. Accordingly, burn-in can be prevented more effectively.

Next, the operation of the liquid crystal display device 30 of the embodiment will be described, together with reference to the timing chart of FIG. 12.

Figure 12:
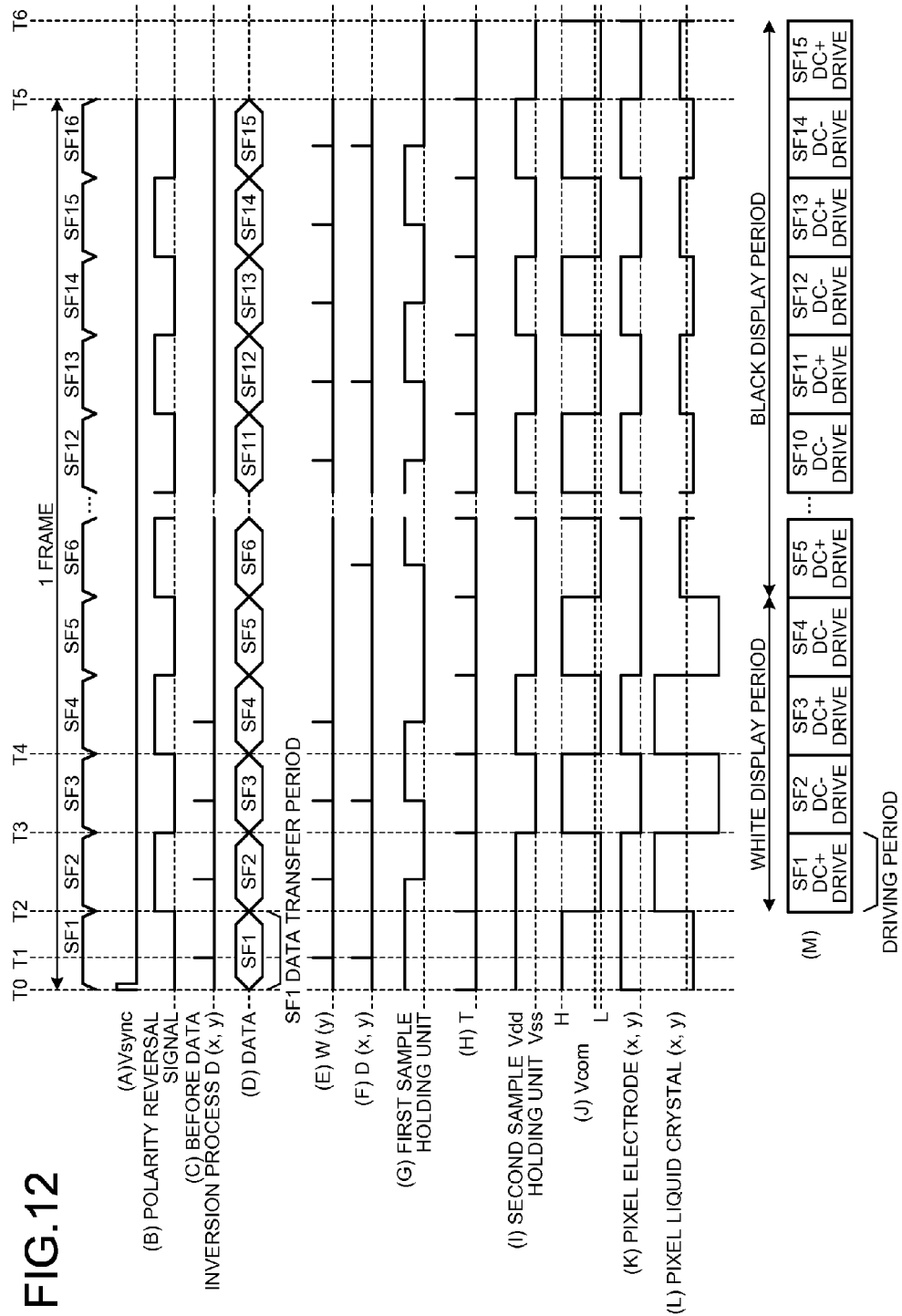
FIG. 12 is a timing chart illustrating the operation of the liquid crystal display device of FIG. 4.

When the vertical synchronization signal Vsync to be supplied is activated at time T0 as illustrated in (A) of FIG. 12, the drive control unit 40 controls the memory control unit 38 via the data transfer unit (not illustrated) to sequentially output per-pixel subframe data of the subframe SF1 from the frame buffer 39A or 39B, as well as generates a polarity reversal signal to output the signal to both the data inversion unit 42 and the common voltage selection unit 43. Here, assuming that one frame after time T0 is an even-numbered frame, as described with (A) of FIG. 11, the drive control unit 40 outputs a polarity reversal signal at low level for one subframe period (a transfer period WC) from time T0 to time T2 as illustrated in (B) of FIG. 12.

The memory control unit 38 receives the specified subframe data of the subframe SF1 from the frame buffer 39A or 39B, and transfers the subframe data to the data inversion unit 42. Since the polarity reversal signal supplied at this point is at low level, the data inversion unit 42 outputs the subframe data of the subframe SF1 to the source driver 44 without inverting the subframe data.

In FIG. 12, (C) illustrates one-bit subframe data before an inversion process in a pixel at a certain coordinates (x, y) location, the subframe data being outputted from the data transfer unit (not illustrated). In FIG. 12, (F) illustrates the subframe data of the pixel at the certain coordinates (x, y) location, the subframe data being supplied to the source driver 44 after an inversion process by the data inversion unit 42.

Assuming here that, the subframe data of SF1 to SF15 of the pixel at the certain coordinates (x, y) location, the subframe data being outputted from the data transfer unit (not illustrated), changes as in [111100000000000] illustrated in (C) of FIG. 12 within one frame period, the polarity reversal signal is reversed in each subframe as illustrated in (B) of FIG. 12, and is [010101010101010]. Accordingly, the data of the pixel to be inverted by the data inversion unit 42 and transferred to the source driver 44 becomes [101001010101010] as illustrated in (F) of FIG. 12.

Whenever storing one line of subframe data of SF1, the source driver 44 simultaneously transfers the subframe data to the pixel circuits 15 of corresponding pixels of the image display unit 46 using the column data lines D0 to Dn. At this point, the gate driver 45 supplies a row selection signal to the row selection line Wy of the row y specified by the vertical start signal (VST)/the vertical shift clock signal (VCK) from the drive control unit 40 to activate the row selections line Wy, and selects (n+1) pixels of all columns of the specified row y.

The first switching units 21 of the pixel circuits 15 of the pixels of the selected row y are activated, and the pixel circuit 15 samples the subframe data supplied via the connected column data line among one line of the (n+1) subframe data of SF1 inputted in parallel from the source driver 44 via the column data lines D0 to Dn, and holds the per-pixel subframe data in the first sample holding unit 22. In FIG. 12, (E) illustrates a row selection signal supplied to the row selection line Wy of the certain specified row y at time T1. In FIG. 12, (G) illustrates data held by the first sample holding unit 22 in the pixel circuit 15 of the pixel at the certain coordinates (x, y) location.

When the above operation is repeated on a line-by-line basis, and the transfer of all the subframe data of the subframe SF1 to all the pixel circuits 15 of the image display unit 46 is complete within the transfer period WC from time T0 to time T2 schematically represented as SF1 in (D) of FIG. 12, the drive control unit 40 outputs a common transfer signal at high level to the common signal lines T at time T2 as illustrated in (H) of FIG. 12, and simultaneously supplies the common transfer signal to all the pixel circuits 15 of the image display unit 46. Consequently, the second switching units 23 in all the pixel circuits 15 of the image display unit 46 are simultaneously activated, and the subframe data of the subframe SF1 held by the first sample holding units 22 in all the pixel circuits 15 of the image display unit 46 are simultaneously transferred to the second sample holding units 24 to be held. In FIG. 12, (I) illustrates data held by the second sample holding unit 24 in the pixel circuit 15 of the pixel at the certain coordinates (x, y) location. The subframe data of the subframe SF1 held by the second sample holding unit 24 is applied as a pixel voltage to the corresponding pixel electrode 12 connected to the pixel circuit 15 to drive the liquid crystal element LC.

On the other hand, as described with (A) to (E) of FIG. 11, the common voltage selection unit 43 generates the common voltage Vcom of the high-level VcomH (=Vw) illustrated in (J) of FIG. 12 by the polarity reversal signal at low level and applies the common voltage to the common electrode 14, during the subframe transfer period from time T0 to time T2. Here, during the transfer period of the subframe data of the subframe SF1 from time T0 to time T2, the data of SF15 being the last subframe of a previous frame is stored in the second sample holding units 24 in all the pixel circuits 15 of the image display unit 46 (here, explicitly represented as "1"). Therefore, during the first subframe period from time T0 to time T2, the Vdd (=Vw−Vb) voltage corresponding to the data of the value "1" is applied to the pixel electrode 12 in the pixel circuit 15 of the certain pixel as illustrated in (K) of FIG. 12, and VcomH (=Vw) is applied to the common electrode 14. Hence, as illustrated in (L) of FIG. 12, the negative voltage −Vb slightly lower than the GND voltage is applied to the liquid crystal layer 13 of the liquid crystal element LC of the pixel, and the pixel displays black as described with FIG. 3B.

Next, during one subframe period from time T2 to time T3, the drive control unit 40 controls the memory control unit 38 via the data transfer unit (not illustrated) to sequentially output per-pixel subframe data of the next subframe SF2 from the frame buffer 39A or 39B, as well as generates a polarity reversal signal at high level as illustrated in (B) of FIG. 12 to output the polarity reversal signal to both the data inversion unit 42 and the common voltage selection unit 43.

As in the above operation from time T0 to time T2, all the subframe data of the subframe SF2 is written to all the pixel circuits 15 of the image display unit 46, line by line, within the transfer period WC from time T2 to time T3 schematically represented by SF2 in (D) of FIG. 12. When the above data writing is complete, the drive control unit 40 outputs a common transfer signal at high level to the common signal lines T at time T3 as illustrated in (H) of FIG. 12, and simultaneously supplies the common transfer signal to all the pixel circuits 15 of the image display unit 46. Consequently, the second switching units 23 in all the pixel circuits 15 of the image display unit 46 are simultaneously activated, and the subframe data of the subframe SF2 held by the first sample holding units 22 in all the pixel circuits 15 of the image display unit 46 is simultaneously transferred to the second sample holding units 24 to be updated and held.

Here, during one subframe period from time T2 to immediately before time T3, the subframe data of the subframe SF1 is held in the second sample holding unit 24 and applied as a pixel voltage to the corresponding pixel electrode 12 connected to the pixel circuit 15. On the other hand, during the above one subframe period from time T2 to time T3, the common voltage Vcom of the low-level VcomL (=−Vb) illustrated in (J) of FIG. 12 is applied by the polarity reversal signal at high level to the common electrode 14.

Therefore, assuming that during the one subframe period from time T2 to immediately before time T3, the value "1" is stored as the subframe data of SF1 in the second sample holding unit 24 in the certain pixel circuit 15, and the Vdd (=Vw−Vb) voltage corresponding to the data of the value "1" illustrated in (K) of FIG. 12 is applied to the pixel electrode 12, the positive voltage+Vw higher than the GND voltage is applied to the liquid crystal layer 13 of the pixel as illustrated in (L) of FIG. 12. Hence, the pixel displays white as described with FIG. 3B. In other words, during the one subframe period from time T2 to immediately before time T3, the DC-balanced drive of negative polarity is performed for the subframe SF1 as schematically represented as "SF1 DC+Drive" in (M) of FIG. 12.

Next, during one subframe period from time T3 to time T4, the drive control unit 40 controls the memory control unit 38 with a control signal CTL to sequentially output per-pixel subframe data of the next subframe SF3 from the frame buffer 39A or 39B, as well as generates a polarity reversal signal at low level as illustrated in (B) of FIG. 12 to output the polarity reversal signal to both the data inversion unit 42 and the common voltage selection unit 43.

As in the above operation from time T2 to time T3, all the subframe data of the subframe SF3 is written to all the pixel circuits 15 of the image display unit 46, line by line, within the transfer period WC from time T3 to time T4 schematically represented by SF3 in (D) of FIG. 12. When the above data writing is complete, the drive control unit 40 outputs a common transfer signal at high level to the common signal lines T at time T4 as illustrated in (H) of FIG. 12, and simultaneously supplies the common transfer signal to all the pixel circuits 15 of the image display unit 46. Consequently, the second switching units 23 in all the pixel circuits 15 of the image display unit 46 are simultaneously activated, and the subframe data of the subframe SF3 held by the first sample holding units 22 in all the pixel circuits 15 of the image display unit 46 is simultaneously transferred to the second sample holding units 24 to be updated and held.

On the other hand, during the above one subframe period from time T3 to time T4, the common voltage Vcom of the high-level VcomH (=Vw) illustrated in (J) of FIG. 12 is applied to the common electrode 14 by the polarity reversal signal at low level.

Here, during one subframe period from time T3 to immediately before time T4, the subframe data of the subframe SF2 is held in the second sample holding unit 24 and applied as a pixel voltage to the corresponding pixel electrode 12 connected to the pixel circuit 15. Therefore, if the value "0" is stored as the subframe data of the SF2 in the second sample holding unit 24 in the pixel circuit 15, the value "0" is stored as the subframe data of SF2 in the second sample holding unit 24 in the pixel circuit 15 during the one subframe period from time T3 to immediately before time T4. Hence, as illustrated in (K) of FIG. 12, the Vss (=GND) voltage corresponding to the data of the value "0" is applied to the pixel electrode 12. As a consequence, as illustrated in (L) of FIG. 12, the negative voltage −Vw lower than the GND voltage is applied to the liquid crystal layer 13 of the pixel. Accordingly, the pixel displays white as described with FIG. 3B.

In other words, during the one subframe period from time T3 to immediately before time T4, the DC-balanced drive of negative polarity is performed for the subframe SF2 as represented as "SF2 DC− Drive" in (M) of FIG. 12. In other words, the polarity of a voltage to be applied to the liquid crystal layer 13 in each pixel is reversed in SF1 and SF2. However, with regard to display, each pixel displays the same white or black.

From then onwards, as in the above description, the DC-balanced drive of negative polarity and the DC-balanced drive of positive polarity are alternately performed for each subframe as schematically illustrated in (M) of FIG. 12. As a consequence, according to the embodiment, since the liquid crystal layer 13 of the liquid crystal elements LC in the pixel circuits 15 is applied with a voltage whose polarity is alternately reversed in each subframe to be AC-driven, burn-in can be prevented. Although the description was given using FIG. 3B, a DC-balanced drive period of negative polarity is a white display period if the subframe data to be applied to the pixel electrode 12 is "0," and is a black display period if "1." Moreover, a DC-balanced drive period of positive polarity is a black display period if the subframe data to be applied to the pixel electrode 12 is "0," and is a white display period if "1."

In this manner, in the case of the subframe SF1, the period (from time T0 to time T2) is a data transfer period, and the driving period lags by one subframe period and is a period from time T2 to time T3. Hence, the transfer period of the subframe data of all the subframes from SF1 to SF15 is a period from time T0 to time T5, and the driving period is a period from time T2 to time T6. Time T6 is a time after one subframe period from time T5. Looking at the applied voltage to the pixel liquid crystal in the period (from time T2 to time T6) illustrated in (L) of FIG. 12, from the subframes SF1 to SF4 is a white display period, and from the subframes SF5 to SF15 is a black display period, which agrees with the data before the inversion process illustrated in (C) of FIG. 12.

Next, a description will be given of an effect of providing the frame rate control unit 33 to a drive circuit of the liquid crystal display device 30 of the embodiment.

Figure 13:
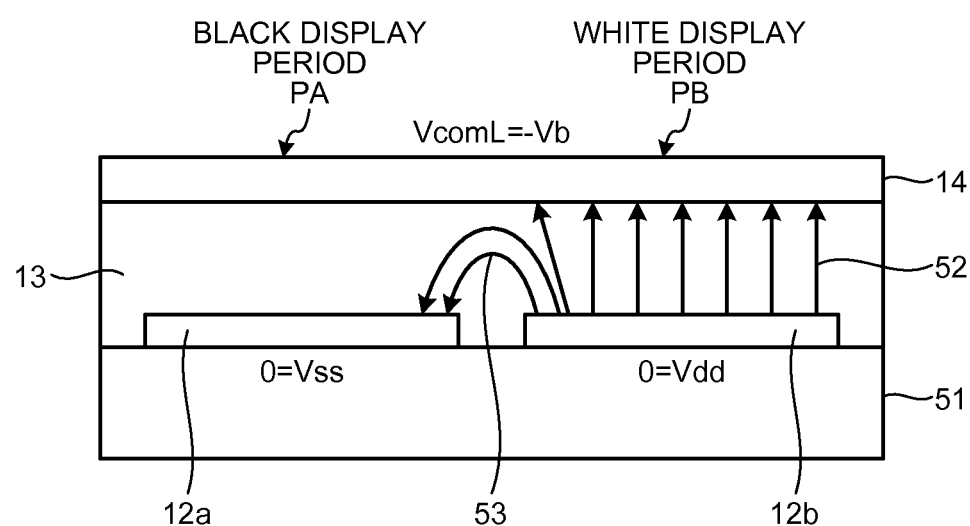
FIG. 13 is an explanatory view of the mechanism of the generation of a lateral electric field in a reflective liquid crystal element.

FIG. 13 illustrates an explanatory view of the mechanism of the generation of a lateral electric field in the reflective liquid crystal element LC. As illustrated in FIG. 13, a pixel electrode 12a of the reflective liquid crystal element LC of a pixel PA and a pixel electrode 12b of the reflective liquid crystal element LC of a pixel PB are formed on a silicon substrate 51, and are disposed away from and opposed to the common electrode 14 of the pixels PA and PB. Moreover, the liquid crystal layer 13 is sealed between the pixel electrodes 12a and 12b and the common electrode 14.

In a case of digital driving, it frequently happens to have different driving states (driving/blanking) between adjacent pixels. For example, it is assumed that the driving states of the adjacent pixels PA and PB illustrated in FIG. 13 are different, that the pixel PA is in the blanking state, and that the pixel PB is in the driving state. At this point, for example in a case of the DC-balanced drive of positive polarity, the pixel voltage Vss is applied to the pixel electrode 12a of the pixel PA in the blanking state, and the pixel voltage Vdd is applied to the pixel electrode 12b of the pixel PB in the driving state. Moreover, the common voltage Vcom to be applied to the common electrode 14 is VcomL (=−Vb).

Therefore, a potential difference arises between the pixel electrode 12b of the pixel PB in the driving state and the common electrode 14, and an electric field 52 is generated in the liquid crystal layer 13, and the liquid crystal is caused to rotate by a predetermined amount. At this point, a potential difference also arises between the pixel electrode 12a of the pixel PA in the blanking state and the pixel electrode 12b of the pixel PB, and an electric field 53 is generated in a lateral direction with respect to the electric field 52. This phenomenon occurs similarly also in a case of the DC-balanced drive of negative polarity. Such a lateral electric field 53 causes unintended disturbance in the action of the liquid crystal between the pixels. The above phenomenon becomes a cause of image degradation.

However, in the liquid crystal display device 30 of the embodiment, as will be described with FIG. 14, a lateral electric field can be uniformly distributed by the frame rate control by the frame rate control unit 33, and the above phenomenon can be solved.

Figure 14:
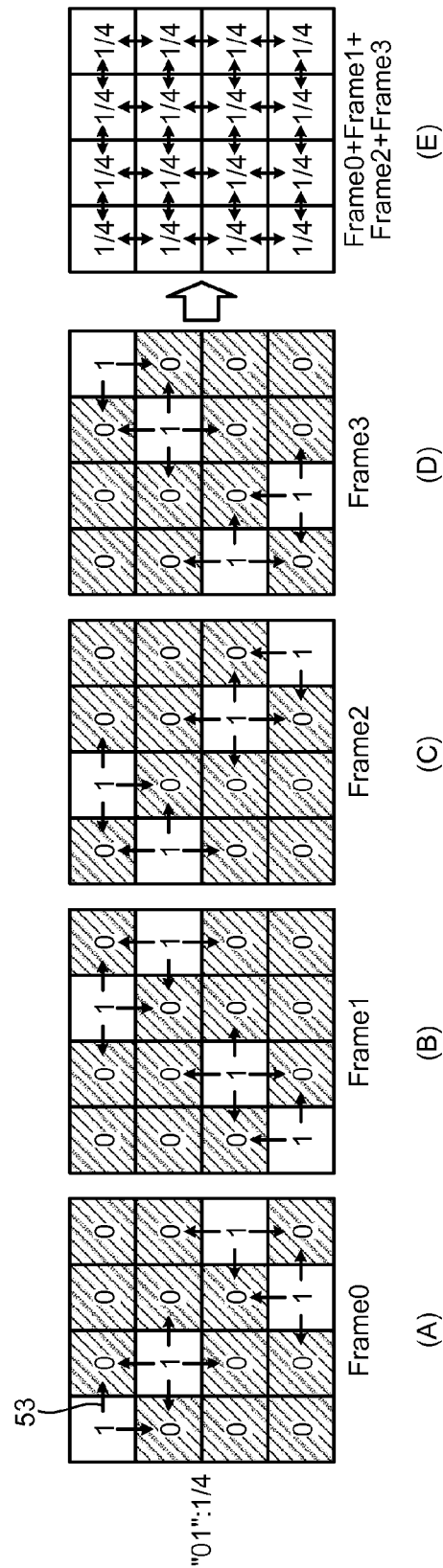
FIG. 14 is a diagram illustrating that the lateral electric field is reduced by frame rate control by the frame rate control unit in FIG. 4.
Figure 15:
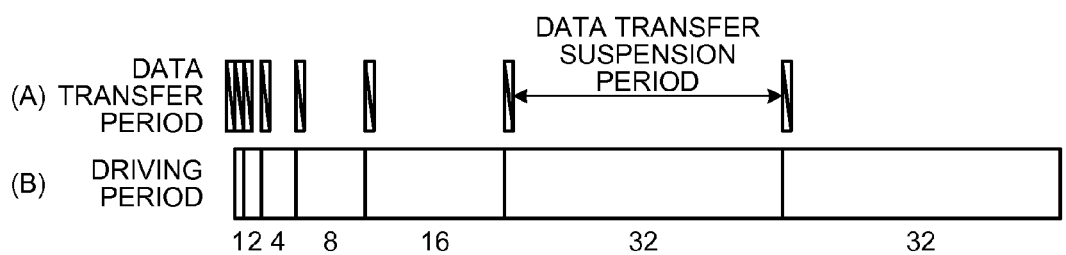
FIG. 15 is a diagram illustrating a long data transfer suspension period being a problem of a known liquid crystal display device.

FIG. 14 illustrates a case where the value of lower F bits of input data ((M+F) bits) into the frame rate control unit 33 is "01." The frame rate control unit 33 uses four frame rate control tables (frames 0 to 3), switching them for each frame. If adjacent pixels are in different driving states (driving or blanking) in each frame, a lateral electric field is generated in a direction from a pixel in the driving state of "1" (the driving state) to a pixel in the driving state of "0" (the blanking state). Therefore, in the case of FIG. 14, lateral electric fields are generated in directions indicated by arrows in (A), (B), (C), (D) of FIG. 14, respectively, in frame 0, frame 1, frame 2, and frame 3.

As described above, the frame rate control unit 33 identifies the location in the frame rate control table based on the value of the lower F bits of the inputted video signal data of (M+F) bits, and the location information of a pixel and the frame count information, and adds the value to upper M bits of the input video signal data to converts the value into M-bit data. Here, the value obtained by identifying the location in the frame rate control table is a value of the average of a total of four frames from frame 0 to frame 3, the value being indicated in (E) of FIG. 14, overlapping the states of the lateral electric fields in the four frames. As illustrated in (E) of FIG. 14, on the average of the four frames, all the lateral electric fields between the pixels are distributed and balance each other out. In this manner, it is possible to distribute lateral electric fields being a cause of image degradation and balance each other out by using the frame rate control.

As described above, according to the first embodiment, efficient data transfer and driving are possible without providing a data transfer suspension period, and also without a need for the drive suspension period. Moreover, since the voltage selection unit is not required, the downsizing of a pixel can be achieved as well as efficient subframe data transfer and driving are possible so that a high resolution or high quality image can be displayed with a low cost configuration.

That is, according to the liquid crystal display device 30 of the embodiment, the first and second sample holding units 22 and 24 in the pixel circuit 15 illustrated in FIG. 2 can be respectively configured of, for example, a latch circuit including four transistors. Moreover, since a voltage selection unit required in a pixel of a liquid crystal display device becomes unnecessary, the number of transistors of a pixel circuit can be reduced compared with a known liquid crystal display device, and accordingly the downsizing of a pixel can be achieved and costs can also be reduced.

Moreover, according to the liquid crystal display device 30 of the embodiment, as described with FIG. 12, subframe data can be transferred without a suspension period of the subframe data, and display is performed based on the subframe data of an immediately previous subframe during the transfer period of the subframe data of a certain subframe. Hence, data can be transferred more efficiently than the known liquid crystal display device, and a phenomenon where the display becomes dark due to the drive suspension period can also be prevented since there is no drive suspension period. Moreover, according to the liquid crystal display device 30 of the embodiment, the frame rate control can improve image degradation by a lateral electric field.

Moreover, according to the liquid crystal display device 30 of the embodiment, as described with FIGS. 11 and 12, the DC-balanced drive of positive polarity and the DC-balanced drive of negative polarity are alternately performed for each subframe, and since the order is also reversed in each frame, burn-in can be sufficiently prevented.

Therefore, a three-dimensional video display device with high resolution and high brightness can be realized at low cost by using the liquid crystal display device 30 of the embodiment having the above features.

Second Embodiment

Next, a liquid crystal display device and a method for driving the same in a second embodiment of the present invention will be described in detail with reference to the drawings. With regard to the liquid crystal display device and the method for driving the same in the second embodiment, the drawings and description of the content common to the first embodiment will be omitted.

Figure 16A:
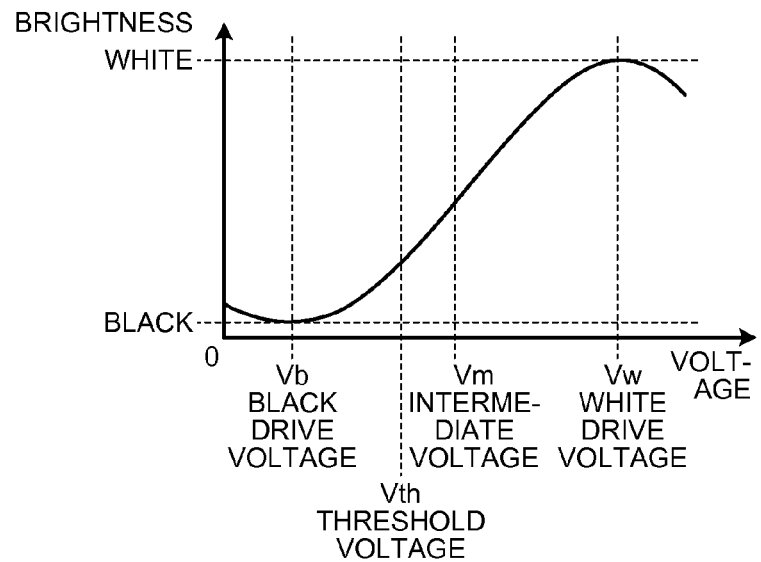
FIGS. 16A to 16C are explanatory views of an example of a method for setting Vdd and Vcom of a reflective liquid crystal display element in a second embodiment of the present invention.
Figure 16B:
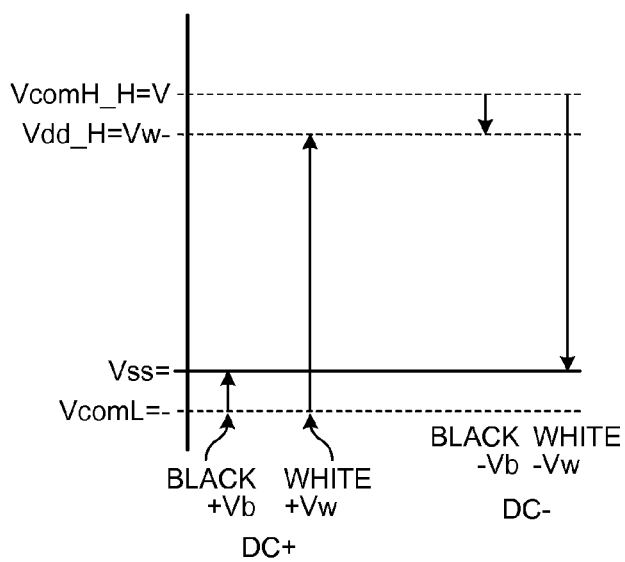
Figure 16C:
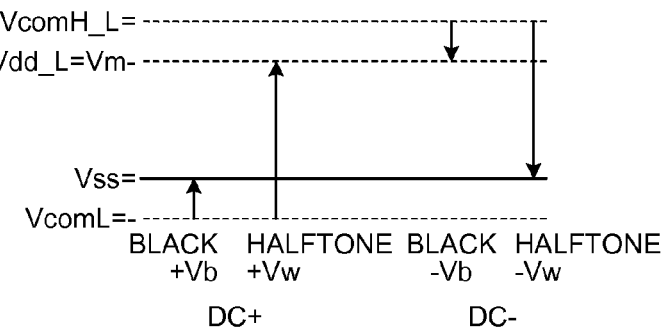

FIGS. 16A to 16C are explanatory views of an example of a method for setting Vdd and Vcom of the reflective liquid crystal display element 11 in the second embodiment. FIG. 16A is an example illustrating a relationship between an input voltage and the intensity (brightness) of output light. In FIG. 16A, the horizontal axis represents the input voltage, and indicates a potential difference between the pixel electrode 12 and the common electrode 14, that is, a drive voltage of the liquid crystal layer 13. Moreover, the vertical axis of FIG. 16A represents the intensity of output light emitted from the liquid crystal layer 13. A voltage when the intensity of the output light emitted from the liquid crystal layer 13 is the lowest is defined as Vb (a black voltage), and a voltage at which the intensity of the output light saturates is defined as Vw (a white voltage). Moreover, Vm (an intermediate voltage) is set as a voltage at around the middle between Vw (the white voltage) and Vb (the black voltage), the voltage being higher than Vth which is a threshold voltage of the sample holding unit (a threshold voltage to rewrite data to be sampled and held).

FIG. 16B illustrates a diagram illustrating the operation upon polarity reversal during white/black driving. As described above, the liquid crystal display device needs to perform the polarity reversal drive (the DC-balanced drive) in order to prevent liquid crystal burn-in.

As illustrated in FIG. 16B, if the polarity of a liquid crystal applied voltage where the common voltage is subtracted from the pixel electrode voltage is + (DC+), if −Vb being the low-level VcomL is applied to the common voltage Vcom and accordingly "0" is held in the second sample holding unit 24, Vb (=Vss−(VcomL)=0−(−Vb)) is applied to the liquid crystal layer 13 to display black. Moreover, in the case of DC+, if "1"

is held in the second sample holding unit 24, Vw (=Vdd(H)−(VcomL)=(Vw−Vb)−(−Vb)) is applied to the liquid crystal layer 13 to display white.

On the other hand, if the polarity of a liquid crystal applied voltage where the common voltage is subtracted from the pixel electrode voltage is − (DC−), if Vw being VcomH(H) as the high-level VcomH is applied to the common voltage Vcom and accordingly "0" is held in the second sample holding unit 24, −Vw (=Vss−VcomH(H)=0−Vw) is applied to the liquid crystal layer 13 to display white. Moreover, in the case of DC−, if "1" is held in the second sample holding unit 24, −Vb (=Vdd−VcomH(H)=(Vw−Vb)−Vw) is applied to the liquid crystal layer 13 to display black.

In this manner, in the case of DC+, if "0" is held in the second sample holding unit 24, black is displayed and, if "1" is held, white is displayed. In the case of DC−, conversely, if "0" is held in the second sample holding unit 24, white is displayed and, if "1" is held, black is displayed. Hence, in the case of DC−, it is necessary to invert data held in the second sample holding unit 24.

FIG. 16C illustrates a diagram illustrating the operation upon polarity reversal during halftone/black driving. As described above, the liquid crystal display device needs to perform the polarity reversal drive (the DC-balanced drive) in order to prevent liquid crystal burn-in.

As illustrated in FIG. 16C, if the polarity of a liquid crystal applied voltage where the common voltage is subtracted from the pixel electrode voltage is + (DC+), −Vb being the low-level VcomL is applied to the common voltage Vcom and accordingly "0" is held in the second sample holding unit 24, Vb (=Vss−VcomL=0−(−Vb)) is applied to the liquid crystal layer 13 to display black. Moreover, in the case of DC+, if "1" is held in the second sample holding unit 24, Vm (=Vdd(L)−VcomL=(Vm−Vb)−(−Vb)) is applied to the liquid crystal layer 13 to display a halftone.

On the other hand, if the polarity of a liquid crystal applied voltage where the common voltage is subtracted from the pixel electrode voltage is − (DC−), Vm being VcomH(L) is applied to the common voltage Vcom as the high-level VcomH and accordingly "0" is held in the second sample holding unit 24, −Vm (=Vss−VcomH(L)=0−Vm) is applied to the liquid crystal layer 13 to display a halftone. Moreover, in the case of DC−, if "1" is held in the second sample holding unit 24, −Vb (=Vdd(L)−VcomH(L)=(Vm−Vb)−Vm) is applied to the liquid crystal layer 13 to display black.

In this manner, in the case of DC+, if "0" is held in the second sample holding unit 24, black is displayed and, if "1" is held, a halftone is displayed. In the case of DC−, conversely, if "0" is held in the second sample holding unit 24, a halftone is displayed and, if "1" is held, black is displayed. Hence, in the case of DC−, it is necessary to invert data held in the second sample holding unit 24 as in FIG. 16B.

Figure 17:
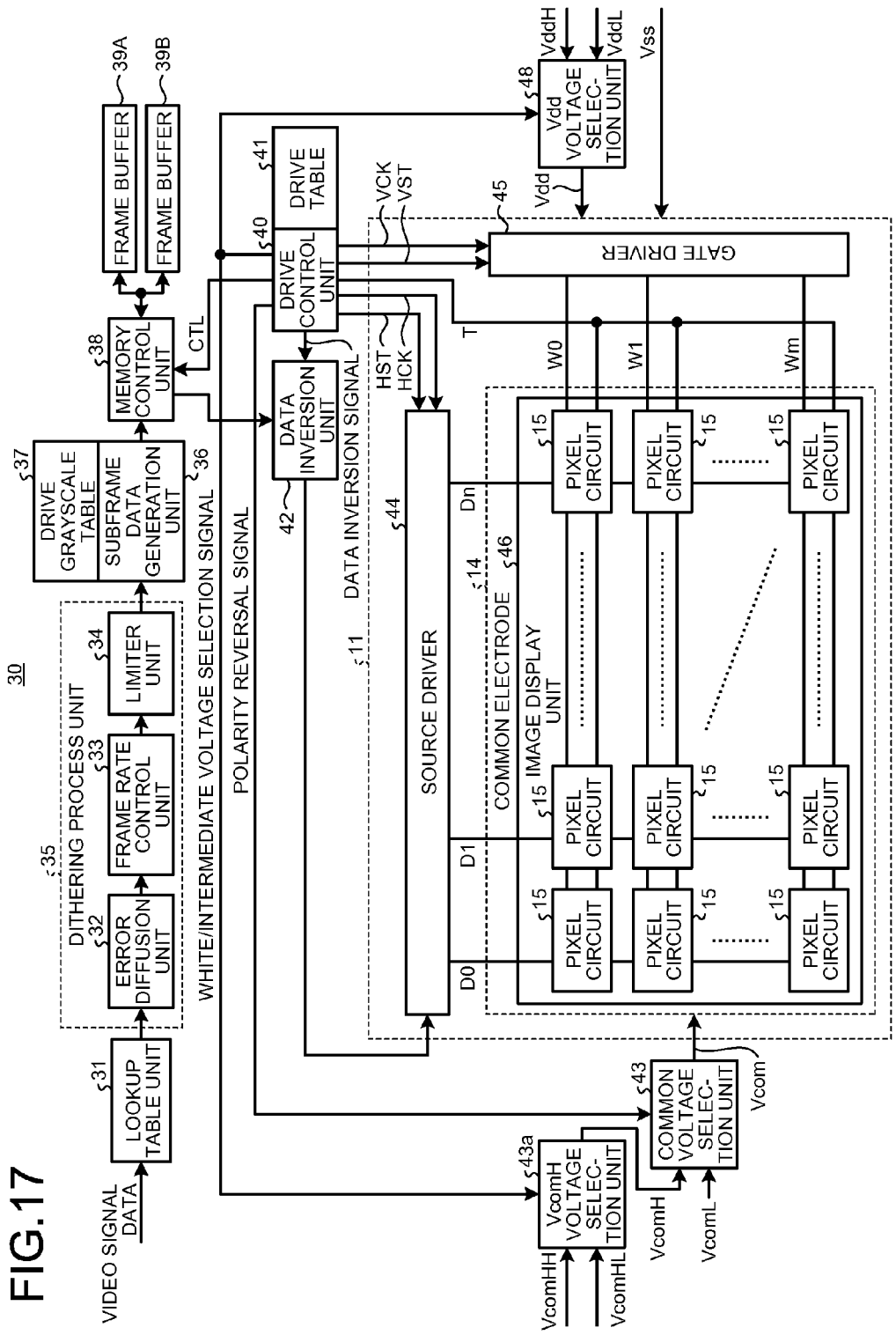
FIG. 17 is a block diagram of one mode of a liquid crystal display device in the second embodiment of the present invention.

Next, a description will be given of the configuration of the liquid crystal display device in the second embodiment. In FIG. 17, a different part from the configuration of the liquid crystal display device in the first embodiment illustrated in FIG. 4 is to include a VcomH voltage selection unit 43a (a high-level common voltage selection unit) in addition to the common voltage selection unit 43 to apply the common voltage Vcom. Moreover, it is to include a Vdd voltage selection unit 48 to apply the pixel voltage Vdd. Furthermore, it is to provide a drive table 41 for operating the drive control unit 40.

Next, the configuration and operation of the liquid crystal display device 30 of the embodiment will be described using FIG. 18 that describes the number of bits (grayscale representation) of output signals of the blocks of the main parts of FIG. 17, and the like. In FIG. 17, the lookup table unit 31 receives N-bit video signal data as an input signal, and converts the video signal data into data of (M+F+D) bits larger than N. Here, M represents the number of bits when the number of grayscale levels driven is expressed in a binary number, F represents the number of bits interpolated by the frame rate control unit 33, and D represents the number of bits interpolated by the error diffusion unit 32. M, F, and D are respectively natural numbers.

Figure 18:
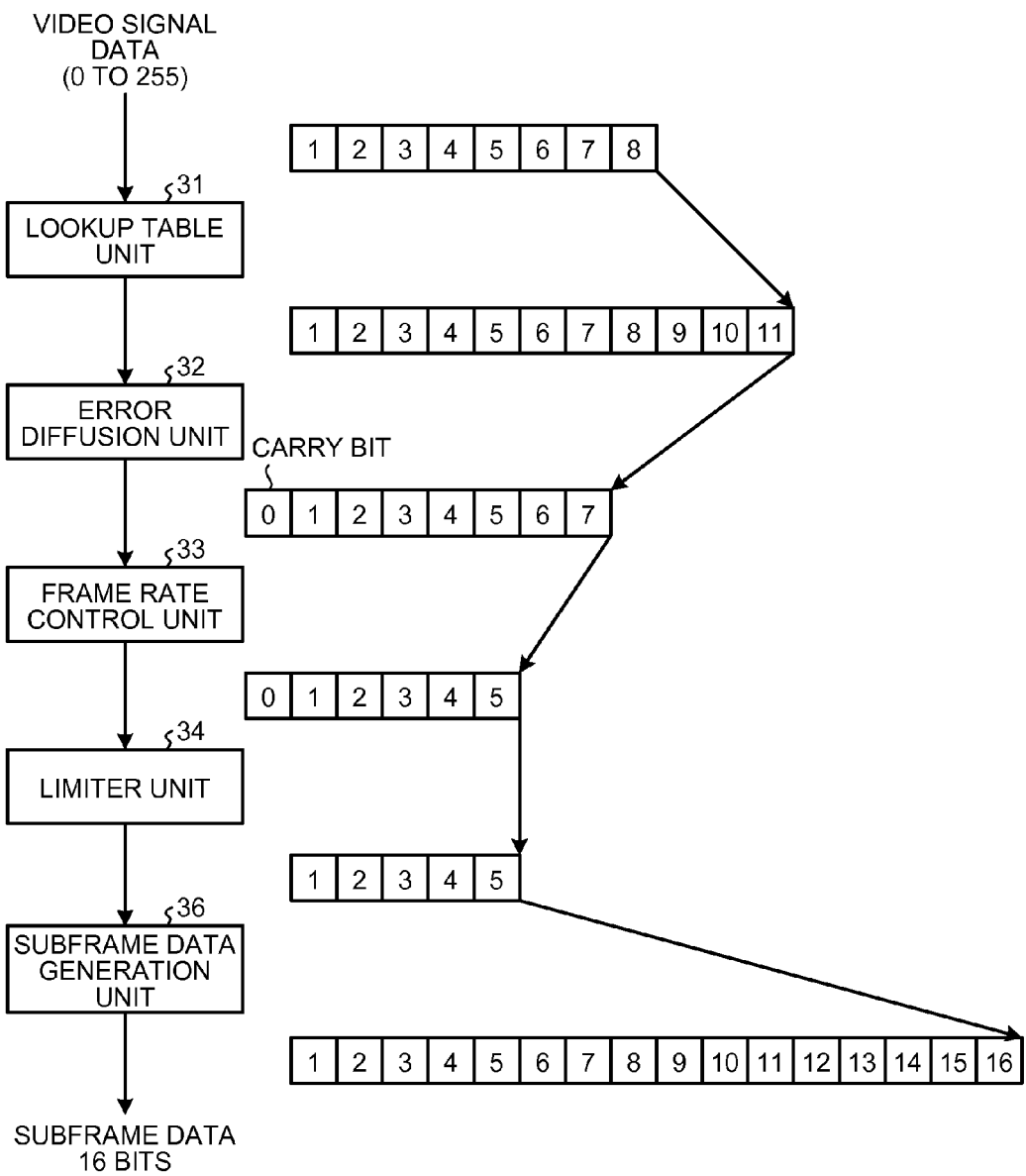
FIG. 18 is a diagram illustrating an example of a grayscale representation in blocks of main components of FIG. 17.

FIG. 18 is an example of a case where the number of bits N of the input video signal data is set to "eight" and the number of grayscale levels is set to "31," and the number of bits D interpolated by the error diffusion unit 32 to "four," and the number of bits F interpolated by the frame rate control unit 33 to "two." Moreover, the number of bits M when the number of grayscale levels is expressed in a binary number is set to "five."

The lookup table unit 31 is previously adjusted such that an 11-bit output has arbitrary output characteristics (for example, gamma 2.2). For example, images respectively by the driving at 31 drive grayscale levels (not including black) in the drive grayscale table 37 of FIG. 19 are projected onto the screen 18 in the projection display device 10 illustrated in FIG. 1. The luminance on the screen 18 at that time for each image is respectively measured by a light meter or the like. Each luminance between the drive grayscale levels is linearly interpolated by six bits (M+D=6) (64 grayscale levels) and accordingly luminance data for each of 0 to 1984 (31×64) grayscale levels is predicted. The lookup table unit 31 is assumed to select 256 data that has arbitrary output characteristics (for example, gamma 2.2) from the luminance data, and previously hold the data as a lookup table.

The lookup table unit 31 includes the lookup table of 256×11 bits (that is, "two to the eighth power" grayscale levels×(5+2+4) bits). Here, "two to the eighth power" grayscale levels×(5+2+4) bits corresponds to "two to the N-th power" grayscale levels×(M+F+D) bits where the values of N=8, M=5, F=2, and D=4 are substituted. The lookup table unit 31 converts inputted eight-bit image data into 11-bit data to output the data.

Returning to FIG. 17, a description will be given. The error diffusion unit 32 diffuses to neighboring pixels lower D-bit information of the video signal data converted by the lookup table unit 31 into (M+F+D) bits, pursuant to the error diffusion method, to convert the information into data of (M+F) bits. In the example of FIG. 18, the error diffusion unit 32 diffuses to neighboring pixels lower four-bit information of the 11-bit data converted by the lookup table unit 31, quantizes the information to upper seven-bit data, and outputs the data. The output data of the error diffusion unit 32 includes one carry bit and the seven-bit data.

Figure 20:
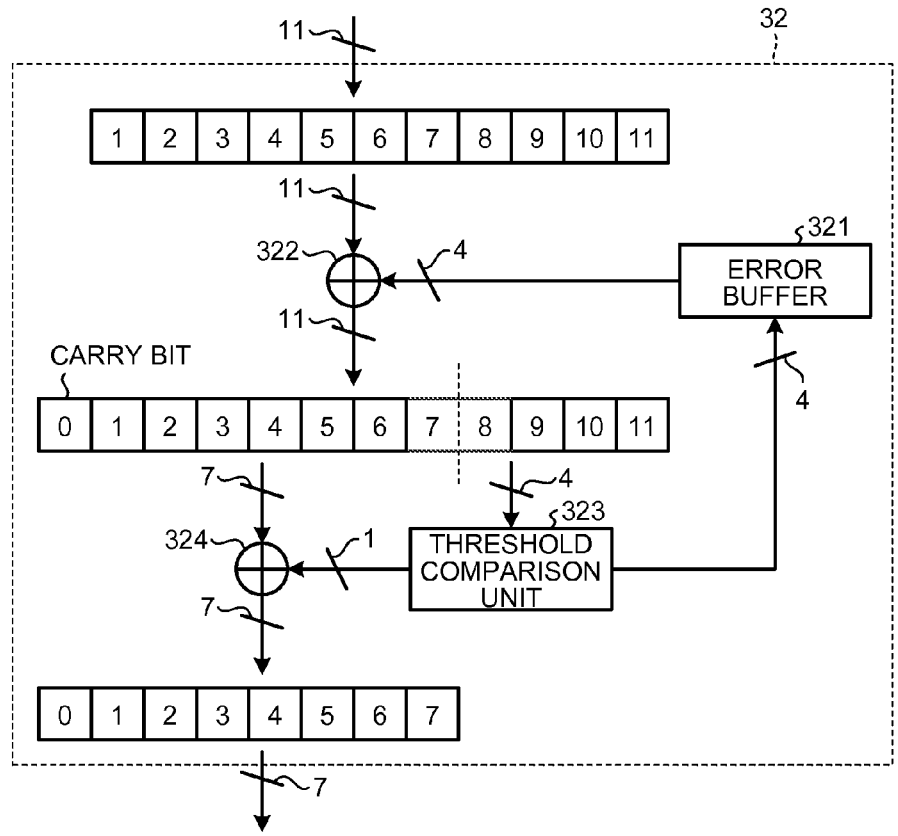
FIG. 20 is a configuration diagram of an example of an error diffusion unit in FIG. 17.

The configuration and operation of the error diffusion unit 32 will be described in more detail using FIG. 20. The error diffusion unit 32 diffuses to neighboring pixels a display error of a pixel at certain coordinates where there is the 11-bit video signal data as described with FIG. 7, and adds the display error to an error diffused by the neighboring pixel. In other words, in FIG. 20, the inputted 11-bit video signal data is first added in the addition unit 322 to the error diffused from the neighboring pixel and read from the error buffer 321. The addition unit 322 generates 12-bit data where one carry bit is added to the 11-bit data after addition in the most significant bit location, considering a carry upon addition. In FIG. 20, a carry bit 0 is added to the 11-bit data after the addition unit 322. Next, the video signal data after addition outputted from the addition unit 322 is divided into upper eight bits and lower four bits. The upper eight bits are supplied to the addition unit 324. The lower four bits are supplied to the threshold comparison unit 323.

The values of the divided lower 4 bits are illustrated below. The values on the right are display errors.

| Lower 4 Bits | Display Error |
|---|---|
| 0000 | 0 |
| 0001 | +1 |
| 0010 | +2 |
| 0011 | +3 |
| 0100 | +4 |
| 0101 | +5 |
| 0110 | +6 |
| 0111 | +7 |
| 1000 | −7 |
| 1001 | −6 |
| 1010 | −5 |
| 1011 | −4 |
| 1100 | −3 |
| 1101 | −2 |
| 1110 | −1 |
| 1111 | 0 |

The threshold comparison unit 323 supplies a display error corresponding to the value of the divided lower four bits to the error buffer 321 to diffuse the error to neighboring pixels, pursuant to FIG. 7, add the error to a previous display error, and hold it. Moreover, the threshold comparison unit 323 makes a threshold comparison for the value of the divided lower four bits. If the value of the divided lower four bits is larger than "1000" (the value representing a negative display error indicated in the line below the line where the value of four bits in the above table is "1000"), the threshold comparison unit 323 outputs "1" to the addition unit 324 to add "1" to the value of the divided upper eight bits. The addition unit 324 generates eight-bit data, and outputs the data as data after error diffusion by the error diffusion unit 32.

In the example of FIG. 18, the frame rate control unit 33 derives a value of 0/1 from the frame rate control table based on lower two-bit information of the eight-bit video signal data after error diffusion outputted from the error diffusion unit 32, and the location information of a target pixel in a display area and frame counter information, and adds the value to the value of upper six bits separated from the inputted eight-bit video signal data after error diffusion.

Figure 21:
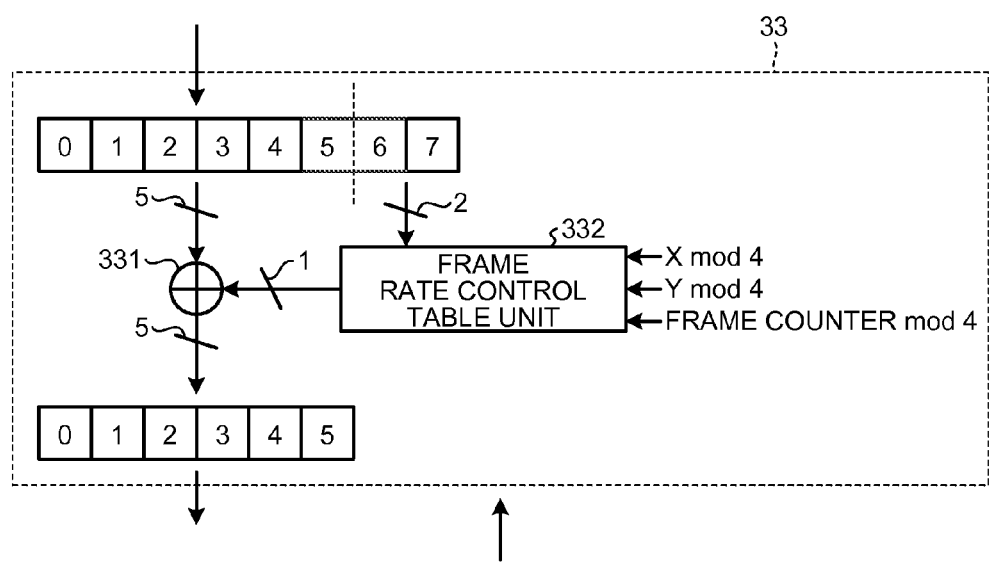
FIG. 21 is a configuration diagram of an example of a frame rate control unit in FIG. 17.

The configuration and operation of the frame rate control unit 33 will be described in more detail using FIGS. 21 and 10. In FIG. 21, firstly, the frame rate control unit 33 divides the inputted eight-bit video signal data after error diffusion into upper six bits and lower two bits, and supplies the upper six-bit data to the addition unit 331 and the lower two-bit data to the frame rate control table unit 332.

The addition unit 331 adds the value, "0" or "1," identified by the frame rate control table unit 332 to the upper six-bit data of the inputted eight-bit video signal data after error diffusion, and outputs the six-bit data after addition as output data of the frame rate control unit 33.

The limiter unit 34 illustrated in FIGS. 17 and 18 limits the value of the six-bit data outputted from the frame rate control unit 33 to, for example, "31" being a maximum value of drive grayscale, and outputs the limited five-bit data to the subframe data generation unit 36. Here, the error diffusion unit 32, the frame rate control unit 33, and the limiter unit 34 configure the dithering process unit 35 as illustrated in FIG. 17, and generate five-bit data where grayscale is interpolated by performing a visual psychological computation, what is called a dithering process, in the temporal or spatial direction on 11-bit video signal data after grayscale interpolation supplied by the above operation from the lookup table unit 31. Consequently, improvement in image quality can be achieved.

The subframe data generation unit 36 illustrated in FIG. 17 uses the drive grayscale table 37, and converts the five-bit data outputted from the limiter unit 34 into, for example, 16-bit data indicating the maximum grayscale level, "31," as illustrated in FIG. 18. The 16-bit data is data composed of 16 one-bit subframe data indicating whether or not a target pixel performs display in a subframe assigned in accordance with a bit position out of 16 subframes each having a display period where one frame period is divided into 16.

FIG. 19 illustrates a specific example of the drive grayscale table 37 used by the subframe data generation unit 36. In FIG. 19, the horizontal axis represents data values respectively in subframes SF1 to SF16 (a driving period if 1 and a blanking period if 0), and the vertical axis represents grayscale levels. The grayscale of the vertical axis represents a grayscale generated by the frame rate control unit 33 and limited by the limiter unit 34 to "31" being the maximum value of drive grayscale. The drive grayscale table 37 illustrated in FIG. 19 represents the drive grayscale table 37 when dividing one frame of a video signal into the 16 subframes SF1 to SF16 each having a shorter display period than one frame period and displaying 32 grayscale levels from level 0 to level 31. SF 1 to SF16 indicate the order of the subframes in one frame.

As illustrated in FIG. 19, the drive grayscale table 37 divided into SF1 with a weight of "one," and SF2 to SF16 with a weight of "two" represents grayscale by a combination of subframes having different weights, and is set for SF2 to SF16 such that if a grayscale level to be displayed increases, the number of the subframes to be driven increases sequentially from SF2. For example, if the grayscale level is "six," three subframes from the subframes SF2 to SF4 are driven, and 13 subframes of the subframes SF1 and SF5 to SF16 are not driven. Moreover, if the grayscale level is "seven," four subframes from the subframes SF1 to SF4 are driven, and 12 subframes from the subframes SF5 to SF16 are not driven. All the subframes SF1 to SF16 are driven at the maximum grayscale level "31." In other words, as the level of grayscale increases, SF1 falls in the driving state only when the level is an even number, and the number of subframes to fall in the driving state increases temporally backward after SF2.

The subframe data generation unit 36 acquires one-bit subframe data respectively in the subframes SF1 to SF16, using the drive grayscale table 37 illustrated in FIG. 19, in accordance with the grayscale level indicated by the five-bit data supplied from the dithering process unit 35, and outputs the data of 16 bits in total to the memory control unit 38. For example, if the five-bit data on which the dithering process has been performed is [00111], the subframe data generation unit 36 converts the five-bit input data into data [1111000000000000] of 16 bits in total, which indicates whether to be driven respectively in SF1 to SF16, referring to the drive grayscale table 37 of FIG. 19. The value "1" from the first bit to the fourth bit of the 16-bit data indicates to be driven in SF1 to SF4, and "0" from the fifth to 16th bits indicates to be not driven in SF5 to SF16.

Returning to FIG. 17 again, a description will be given. The drive control unit 40 is supplied with a vertical synchronization signal VSYNC and a horizontal synchronization signal HSYNC of video signal data that is supplied to the lookup table unit 31, and controls timings of processes for each subframe in synchronization with these synchronization signals. Furthermore, the device control unit 40 outputs a control signal CTL to the memory control unit, a data inversion signal to the data inversion unit 42, a polarity reversal signal to the common voltage selection unit 43, and a white/intermediate voltage selection signal to the VcomH voltage selection unit 43a and the Vdd voltage selection unit 48, pursuant to the drive table 41, and controls the source driver 44 and the gate driver 45.

The memory control unit 38 supplies to the two frame buffers 39A and 39B, for example, 16 subframe data supplied from the subframe data generation unit 36. The frame buffers 39A and 39B have a double buffer structure, and while one of the frame buffers is storing subframe data, subframe data stored in the other frame buffer is transferred via the memory control unit 38 in accordance with the control signal CTL from the drive control unit 40. Moreover, in the next frame, the subframe data of the one of the frame buffers stored during the previous frame period is transferred via the data memory control unit 38 in accordance with the control signal CTL from the drive control unit 40, and subframe data from the subframe data generation unit 36 is stored in the other frame buffer. These operations are executed alternately.

The data inversion unit 42 reverses the polarity (reverses the polarity to "1" if "0" and to "0" if "1") of the input subframe data being the subframe data transferred via the memory control unit 38, in accordance with the data inversion signal from the drive control unit 40, if the data inversion signal is at high level, and supplies the subframe data to the source driver 44.

The source driver 44 simultaneously transfers one-bit subframe data of one line of pixels in the same subframe to the pixel circuits 15 of corresponding pixels in the image display unit 46 using the column data lines D0 to Dn whenever receiving the one-bit subframe data from the data inversion unit 42. At this point, the gate driver 45 activates the row selection line Wy of the row y specified by a vertical start signal (VST)/a vertical shift clock signal (VCK) from the drive control unit 40, and selects (n+1) pixels of all columns of the specified row y. The first switching units 21 of the pixel circuits 15 of the pixels of the selected row y are activated, and the pixel circuit 15 samples subframe data supplied via the connected column data line among one line of the (n+1) subframe data inputted in parallel from the source driver 44 via the column data lines D0 to Dn, and holds the per-pixel subframe data in the first sample holding unit 22.

The VcomH voltage selection unit 43a and the Vdd voltage selection unit (power supply voltage selection unit) 48 accord with the white/intermediate voltage selection signal from the drive control unit 40. In a case of a white voltage selection signal, the VcomH voltage selection unit 43a selects VcomHH and outputs it as VcomH, and the Vdd voltage selection unit 48 selects VddH (high level) and outputs it as Vdd. In a case of an intermediate voltage selection signal, the VcomH voltage selection unit 43a selects VcomHL and outputs it as VcomH, and the Vdd voltage selection unit 48 selects VddL (low level) and outputs it as Vdd.

In accordance with the polarity reversal signal from the drive control unit 40, as described above, the common voltage selection unit 43 selects the low-level VcomL for a period during which the polarity of an applied voltage to the liquid crystal element LC of the pixel 20 is +, selects the common voltage Vcom of the high-level VcomH for a period during which the polarity is −, and outputs the voltage to the common electrode 14 of all the pixels 20.

Next, a description will be given of drive patterns of the liquid crystal display device 30 in the second embodiment.

FIG. 22 is a diagram illustrating an example of the drive table 41 held in the drive control unit 40. FIG. 22 illustrates drive tables when the number of subframes in one frame period is 16, the weight of SF1 is "one," the weights of SF2 to SF16 are "two," the refresh rate is 60 Hz, and one frame period is 16.667 [ms]. Moreover, in FIG. 22, (A) to (F) illustrate a drive table for an even-numbered frame and (K) to (P) illustrate a drive table for an odd-numbered frame.

In FIG. 22, (A) and (K) represent the order of driving subframes, and indicate subframes to be driven sequentially from the top. In FIG. 22, (B) and (L) represent subframe data to be read by the memory control unit 38 of FIG. 17 from the frame buffer 39A or 39B and transferred to the image display unit 46 via the data transfer inversion unit 42. The subframe data is transferred sequentially from SF1 to SF16.

In FIG. 22, (C) and (M) represent a driving period for each subframe, and 1041 [us] where one frame period is divided equally into 16 is set. In FIG. 22, (D) and (N) represent a data inversion signal to be outputted by the drive control unit 40 to the data inversion unit 42. It is alternately set that an even-numbered frame starts with "0" and an odd-numbered frame starts with "1."

In FIG. 22, (E) and (O) represent a polarity reversal signal to be outputted by the drive control unit 40 to the common voltage selection unit 43. A value lagging one subframe period behind a data inversion signal is set. In a case of a first subframe period, the value of the last data inversion signal of an odd-numbered frame is set for an even-numbered frame, and the value of the last data inversion signal of an even-numbered frame is set for an odd-numbered frame. In FIG. 22, (F) and (P) represent a white/intermediate voltage selection signal to be outputted by the drive control unit 40 to the VcomH voltage selection unit 43a and the Vdd voltage selection unit 48. The value "1" is set only for a drive order, two, where SF1 is driven.

Moreover, in FIG. 22, (G) to (J) and (Q) to (T) are not information directly necessary for the drive table, but in FIG. 22, (G) and (Q) represent a subframe where the liquid crystal is actually driven. SF16, transferred last, of a previous frame is driven first and SF1 to SF15 are subsequently driven in turn. In FIG. 22, (H) and (R) represent the output of the common voltage selection unit 43. In FIG. 22, (I) and (S) represent the output of the VcomH voltage selection unit 43a. In FIG. 22, (J) and (S) represent the output of the Vdd voltage selection unit 48.

In this manner, the liquid crystal display device 30 of the embodiment reverses the driving polarity in each subframe in the same frame, and drives the liquid crystal element LC by AC. Consequently, burn-in of the liquid crystal layer 13 can be prevented. Furthermore, the driving polarity is reversed also in each frame. Accordingly, burn-in can be prevented more efficiently.

Next, the operation of the liquid crystal display device 30 of the embodiment will be described with reference to the timing chart of FIG. 23 in combination.

Figure 23:
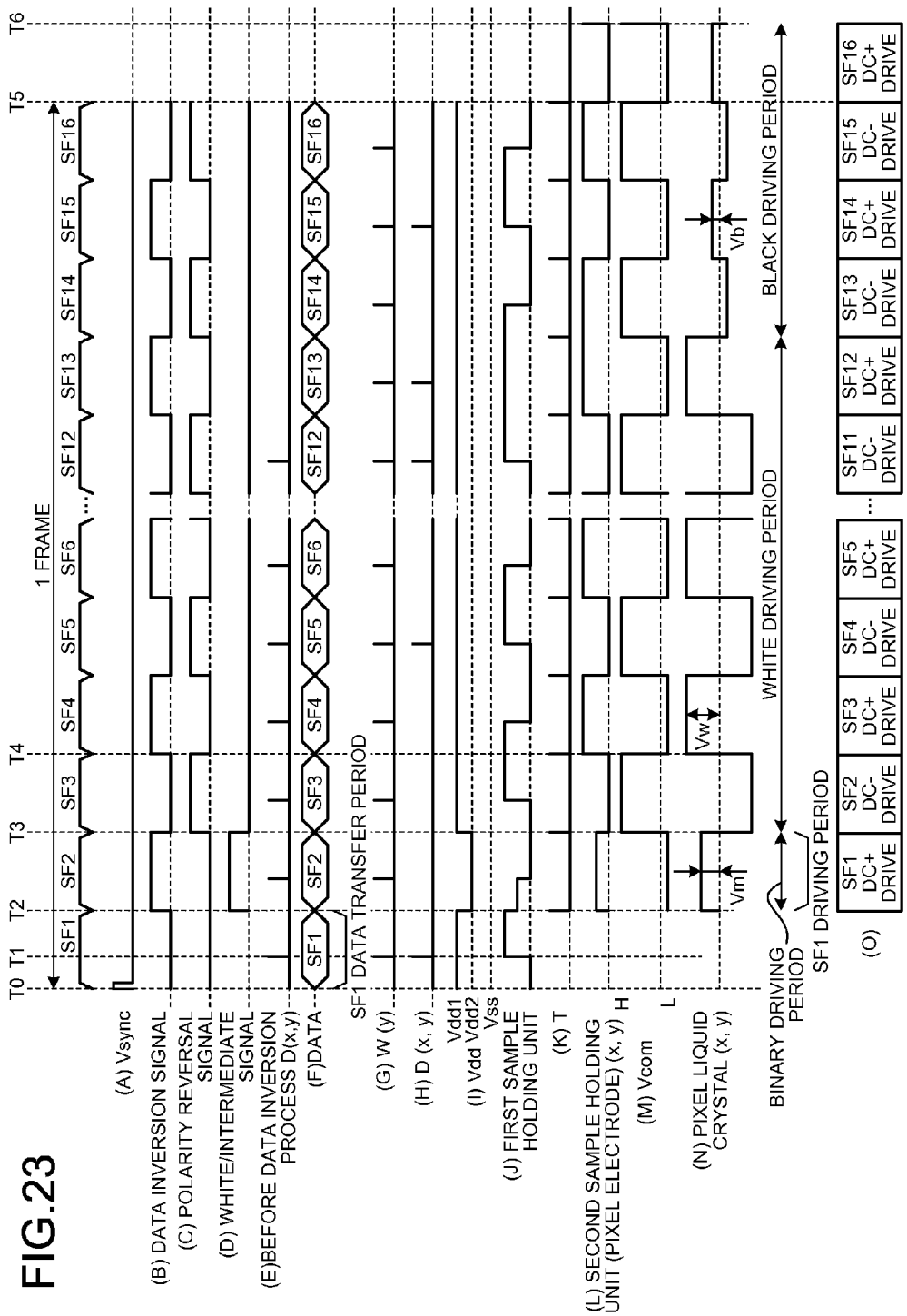
FIG. 23 is a timing chart illustrating the operation of the liquid crystal display device of FIG. 17.

When the vertical synchronization signal Vsync to be supplied is activated at time T0 as illustrated in (A) of FIG. 23, the drive control unit 40 controls the memory control unit 38 via the data transfer unit (not illustrated) to sequentially output per-pixel subframe data of the subframe SF1 from the frame buffer 39A or 39B, pursuant to (B) of FIG. 22, as well as generates a data inversion signal, pursuant to (D) of FIG. 22, to output the data inversion signal to the data inversion unit 42, generates a polarity reversal signal, pursuant to (E) of FIG. 22, to output the polarity reversal signal to the common voltage selection unit 43, and generates a white/halftone drive signal, pursuant to (F) of FIG. 22, to output the white/halftone drive signal to the VcomH voltage selection unit 43a and the Vdd voltage selection unit 48. Here, assuming that one frame after time T0 is an even-numbered frame, as described with FIG. 22, the drive control unit 40 outputs a low-level data inversion signal, polarity reversal signal, and white/halftone drive signal for one subframe period (the transfer period WC) from time T0 to time T2 as illustrated in (B), (C) and (D) of FIG. 23.

The memory control unit 38 receives the subframe data of the specified subframe SF1 from the frame buffer 39A or 39B, and transfers the subframe data to the data inversion unit 42. Since the data inversion signal supplied at this point is at low level, the data inversion unit 42 outputs the subframe data of the subframe SF1 as it is to the source driver 44 without inverting the subframe data.

In FIG. 23, (E) illustrates one-bit subframe data before an inversion process in a pixel at a certain coordinates (x, y) location, the subframe data being outputted from the data transfer unit (not illustrated). In FIG. 23, (H) illustrates the subframe data of the pixel at the certain coordinates (x, y) location, the subframe data being supplied to the source driver 44 after an inversion process by the data inversion unit 42.

Assuming here that, the subframe data of SF1 to SF16 of the pixel at the certain coordinates (x, y) location, the subframe data being outputted from the data transfer unit (not illustrated) changes as in [1111111111110000] illustrated in (E) of FIG. 23 within one frame period, the data inversion signal is reversed in each subframe as illustrated in (B) of FIG. 23, and is [1010101010101010]. Accordingly, the data of the pixel to be transferred to the source driver 44 after a data inversion process by the data inversion unit 42 becomes [1010101010100101] as illustrated in (H) of FIG. 23.

Whenever storing one line of subframe data of SF1, the source driver 44 simultaneously transfers the subframe data to the pixel circuits 15 of corresponding pixels of the image display unit 46 using the column data lines D0 to Dn. At this point, the gate driver 45 supplies a row selection signal to the row selection line Wy of the row y specified by the vertical start signal (VST)/the vertical shift clock signal (VCK) from the drive control unit 40 to activate the row selection line Wy, and selects (n+1) pixels of all columns of the specified row y.

The first switching units 21 of the pixel circuits 15 of the pixels of the selected row y are activated, and the pixel circuit 15 samples the subframe data supplied via the connected column data line among one line of the (n+1) subframe data of SF1 inputted in parallel from the source driver 44 via the column data lines D0 to Dn, and holds the per-pixel subframe data in the first sample holding unit 22. In FIG. 23, (G) represents a row selection signal supplied to the row selection line Wy of the certain specified row y at time T1. In FIG. 23, (J) illustrates data held by the first sample holding unit 22 in the pixel circuit 15 of the pixel at the certain coordinates (x, y) location.

When the above operation is repeated on a line-by-line basis, and the transfer of all the subframe data of the subframe SF1 to all the pixel circuits 15 of the image display unit 46 is complete within the transfer period WC from time T0 to time T2 schematically represented by SF1 in (F) of FIG. 23, the drive control unit 40 outputs a common transfer signal at high level to the common signal lines T at time T2 as illustrated in (K) of FIG. 23, and simultaneously supplies the common transfer signal to all the pixel circuits 15 of the image display unit 46. Consequently, the second switching units 23 in all the pixel circuits 15 of the image display unit 46 are simultaneously activated, the subframe data of the subframe SF1 held by the first sample holding units 22 in all the pixel circuits 15 of the image display unit 46 is simultaneously transferred to and held in the second sample holding units 24. In FIG. 23, (L) illustrates data held by the second sample holding unit 24 in the pixel circuit 15 of the pixel at the certain coordinates (x, y) location. The subframe data of the subframe SF1 held by the second sample holding unit 24 is applied to the corresponding pixel electrode 12 connected to the pixel circuit 15 as a pixel voltage to drive the liquid crystal element LC.

Next, the drive control unit 40 controls the memory control unit 38 via the data transfer unit (not illustrated) during one subframe period from time T2 to time T3 to sequentially output per-pixel subframe data of the next subframe SF2 from the frame buffer 39A or 39B, as well as generates a data inversion signal at high level as illustrated in (B) of FIG. 23 to output the data inversion signal, respectively, to the data inversion unit 42. Since the data inversion signal supplied at this point is at high level, the data inversion unit 42 inverts the subframe data of the subframe SF2 to output the subframe data to the source driver 44. Moreover, a white/halftone drive signal at high level is generated as illustrated in (D) of FIG. 23, and outputted to the VcomH voltage selection unit 43a and the Vdd voltage selection unit 48. Moreover, a polarity reversal signal at low level is generated as illustrated in (C) of FIG. 23, and outputted to the common voltage selection unit 43.

As in the above operation from time T0 to time T2, all the subframe data of the subframe SF2 is written to all the pixel circuits 15 of the image display unit 46, line by line, within the transfer period WC from time T2 to time T3 schematically represented by SF2 in (F) of FIG. 23. When the above data writing is complete, the drive control unit 40 outputs a common transfer signal at high level to the common signal lines T at time T3 as illustrated in (K) of FIG. 23, and simultaneously supplies the common transfer signal to all the pixel circuits 15 of the image display unit 46. Consequently, the second switching units 23 in all the pixel circuits 15 of the image display unit 46 are simultaneously activated, and the subframe data of the subframe SF2 held by the first sample holding units 22 in all the pixel circuits 15 of the image display unit 46 is simultaneously transferred to the second sample holding units 24 to be updated and held.

Here, during one subframe period from time T2 to immediately before time T3, the subframe data of the subframe SF1 is held in the second sample holding unit 24 and applied as a pixel voltage to the corresponding pixel electrode 12 connected to the pixel circuit 15. On the other hand, during the above one subframe period from time T2 to time T3, the common voltage Vcom of the low-level VcomL (=−Vb) illustrated (M) of FIG. 23 is applied by the polarity reversal signal at low level to the common electrode 14. Moreover, VddL (low level) illustrated (I) of FIG. 23 is applied by the white/halftone drive signal at high level to the sample holding unit 2 as a power supply voltage.

Therefore, assuming that during the one subframe period from time T2 to immediately before time T3, a value "1" is stored as the subframe data of SF1 in the second sample holding unit 24 in a certain pixel circuit 15, and the VddL (Vm−Vb) voltage corresponding to the data of the value "1" is applied to the pixel electrode 12 as illustrated in (L) of FIG. 23, the positive voltage+Vm higher than the GND voltage is applied to the liquid crystal layer 13 of the pixel as illustrated in (N) of FIG. 23. Accordingly, the pixel displays a halftone as described with FIG. 16C. In other words, during the one subframe period from time T2 to immediately before time T3, the DC-balanced drive of positive polarity is performed for the subframe SF1 as schematically represented as "SF1 DC+Drive" in (O) of FIG. 23.

Next, during one subframe period from time T3 to time T4, the drive control unit 40 controls the memory control unit 38 with a control signal CTL to sequentially output per-pixel subframe data of the next subframe SF3 from the frame buffer 39A or 39B, as well as generates a polarity reversal signal at high level as illustrated in (C) of FIG. 23 to output the polarity reversal signal to the common voltage selection unit 43, and generates a data inversion signal at low level as illustrated in (B) of FIG. 23 to output the data inversion signal to the data inversion unit 42. Moreover, a white/halftone drive signal at low level is generated as illustrated in (D) of FIG. 23, and outputted to the VcomH voltage selection unit 43a and the Vdd voltage selection unit 48.

As in the above operation of time T2 to time T3, all the subframe data of the subframe SF3 is written to all the pixel circuits 15 of the image display unit 46, line by line, within the transfer period WC from time T3 to time T4 schematically represented by SF3 in (F) of FIG. 23. When the above data writing is complete, the drive control unit 40 outputs a common transfer signal at high level to the common signal lines T at time T4 as illustrated in (K) of FIG. 23, and simultaneously supplies the common transfer signal to all the pixel circuits 15 of the image display unit 46. Consequently, the second switching units 23 in all the pixel circuits 15 of the image display unit 46 are simultaneously activated, and the subframe data of the subframe SF3 held by the first sample holding units 22 in all the pixel circuits 15 of the image display unit 46 is simultaneously transferred to the second sample holding units 24 to be updated and held.

On the other hand, during the above one subframe period from time T3 to time T4, the common voltage Vcom of the high-level VcomH (=Vw) illustrated in (M) of FIG. 23 is applied to the common electrode 14 by the polarity reversal signal at high level and the white/halftone drive signal at low level. Moreover, VddH (high level) illustrated in (I) of FIG. 23 is applied by the white/halftone drive signal at low level to the sample holding unit 2 as a power supply voltage.

Here, during one subframe period from time T3 to immediately before time T4, the subframe data of the subframe SF2 is held in the second sample holding unit 24 and applied as a pixel voltage to the corresponding pixel electrode 12 connected to the pixel circuit 15. Therefore, if the value "0" is stored as the subframe data of SF2 in the second sample holding unit 24 in the pixel circuit 15, the value "0" is stored as the subframe data of SF2 in the second sample holding unit 24 in the pixel circuit 15 during the one subframe from time T3 to immediately before time T4. Hence, as illustrated in (L) of FIG. 23, the Vss (=GND) voltage corresponding to the data of the value "0" is applied to the pixel electrode 12. As a consequence, as illustrated in (N) of FIG. 23, the negative voltage −Vw lower than the GND voltage is applied to the liquid crystal layer 13 of the pixel. Accordingly, the pixel displays white as described with FIG. 16B.

In other words, during the one subframe period from time T3 to immediately before time T4, the DC-balanced drive of negative polarity is performed for the subframe SF2 as schematically represented as "SF2 DC− Drive" in (O) of FIG. 23.

From then onwards, as in the above description, the DC-balanced drive of negative polarity and the DC-balanced drive of positive polarity are alternately performed for each subframe as schematically illustrated in (O) of FIG. 23. As a consequence, according to the embodiment, since a voltage whose polarity is alternately reversed in each subframe is applied to the liquid crystal layer 13 of the liquid crystal elements LC in the pixel circuits 15 to drive the liquid crystal layer 13 by AC, burn-in can be prevented. Although the description was given using FIG. 16, if the subframe data to be applied to the pixel electrode 12 is "0" for a DC-balanced drive period of negative polarity, it is a white display period, and if "1," it is a black display period. Moreover, if the subframe data to be applied to the pixel electrode 12 is "0" for the DC-balanced driving period of positive polarity, it is a black display period, and if "1," it is a white display period.

In this manner, in the case of the subframe SF1, the period (from time T0 to time T2) is a data transfer period, and the driving period is a period from time T2 to time T3 lagging by one subframe period. Hence, the transfer period of the subframe data of all the subframes from SF1 to SF16 is a period from time T0 to time T5, and the driving period is a period from time T2 to time T6. Time T6 is a time one subframe period after time T5. Looking at an applied voltage to a pixel liquid crystal during a period (from time T2 to time T6) illustrated in (N) of FIG. 23, the subframe SF1 is a halftone display, SF2 to SF12 are a white display period, and the subframes SF13 to SF16 are a black display period, which agrees with the data before the inversion process illustrated in (E) of FIG. 23.

As described above, according to the second embodiment, as the same with the first embodiment, efficient data transfer and driving are possible without providing a data transfer suspension period, and also without a need for the drive suspension period. Moreover, since the voltage selection unit is not required, the downsizing of a pixel can be achieved as well as efficient subframe data transfer and driving are possible so that a high resolution or high quality image can be displayed with a low cost configuration.

Furthermore, in the second embodiment, the drive table 41 for operating the drive control unit 40 is provided, and the VcomH voltage selection unit 43a (the high-level common voltage selection unit) and the Vdd voltage selection unit 48 that are operated by the drive control unit 40 are included. Accordingly, the grayscale levels to be generated by the dithering process unit 35 can be further approximately doubled. Consequently, a higher resolution or higher quality image can be displayed at low cost.

As described above, the liquid crystal display device and the method for driving the same according to the present invention are useful especially for a liquid crystal display device that sets a digitized video signal as an input signal, divides one frame into a plurality of subframes, and displays an image, and a method for driving the same.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A liquid crystal display device comprising:
    an image display unit including a plurality of pixels each having a liquid crystal element, the pixels being disposed at intersection portions where a plurality of column data lines intersect a plurality of row selection lines and being connected in common to a common signal line;
    a dithering process unit that outputs data after a dithering process where the dithering process has been performed on a video signal data supplied in a temporal or spatial direction to round the video signal data to a predetermined number of bits;
    a subframe data generation unit that generates subframe data of each of a plurality of subframes, the subframe data being values corresponding to pixel values of the data after the dithering process, from the data after the dithering process based on a drive grayscale table to include the plurality of subframes having a shorter display period than one frame period of the video signal data in each frame of the video signal data;

a data inversion unit that reverses a polarity of the subframe data for each subframe period;

an image display drive unit that sequentially supplies row selection signals to the plurality of row selection lines for each horizontal scanning period and supplies the row selection signals to all of the plurality of row selection lines in one frame period to sequentially select all of the plurality of pixels of the image display unit on a pixels-per-line basis, as well as repeats supplying to the plurality of column data lines the subframe data of one line of pixels outputted from the data inversion unit pixel by pixel and line by line to supply the subframe data outputted from the data inversion unit to all of the plurality of pixels of the image display unit and subsequently supply a common signal to the common signal line; and a common voltage selection unit that alternately selects a high-level common voltage and a low-level common voltage in each subframe period in synchronization with a polarity reversal operation by the data inversion unit, and applying the common voltage to a common electrode of the liquid crystal element, wherein the plurality of pixels each includes the liquid crystal element having a liquid crystal layer sealed between the common electrode and a pixel electrode, a first holding unit that, upon the row selection signal being supplied via the row selection line, samples and holds subframe data outputted from the data inversion unit and supplied by the image display unit via the column data line, a transfer unit that, upon the common signal being supplied via the common signal line, transfers the subframe data held by the first holding unit, and a second holding unit that holds the subframe data transferred by the transfer unit and applies the subframe data to the pixel electrode as a pixel voltage.

2. The liquid crystal display device according to claim 1, wherein the dithering process unit includes:

an error diffusion unit that converts lower D-bit (D is a natural number) information of a target pixel of the video signal data supplied into data where one carry bit is added, in a most significant bit position, to (M+F) bits (where M is a value expressing the number of subframes included in one frame in a binary number, and F is a natural number) generated by diffusing the lower D-bit information to neighboring pixels of the target pixel, pursuant to an error diffusion method;

a frame rate control unit that outputs (M+1)-bit data on which frame rate control has been performed by adding to upper (M+1) bits of the (M+F+1)-bit data a value of 0 or 1 derived, using a frame rate control table, from a value of lower F bits of the (M+F+1)-bit data outputted from the error diffusion unit, and location information of the pixel in a display area and frame count information; and a limiter unit that generates and outputs M-bit data where a value of the data outputted from the frame rate control unit is limited to a maximum value of a drive grayscale.

3. The liquid crystal display device according to claim 1, wherein the data inversion unit switches the order of polarity reversal of the subframe data for each frame.

4. The liquid crystal display device according to claim 1, wherein the drive grayscale table is a table where a value indicating whether each subframe of the plurality of subframes included in one frame is a driving period or a blanking period is assigned to each grayscale level to be displayed, and is a table where the number of subframes in the driving period increases by one whenever a grayscale level to be displayed increases by one.

5. The liquid crystal display device according to claim 1, further comprising a lookup table unit that performs inverse gamma correction on N-bit video signal data inputted to convert the video signal data into video signal data of the number of bits larger than the N bits, and outputs the data after conversion to the dithering process unit as the video signal data supplied.

6. The liquid crystal display device according to claim 1, further comprising a high-level common voltage selection unit that arbitrarily selects one of two types of different high-level common voltages for the high-level common voltage selected by the common voltage selection unit.

7. The liquid crystal display device according to claim 1, further comprising a power supply voltage selection unit that selects a high-level pixel voltage and a low-level pixel voltage for the pixel voltage to be applied to the pixel electrode.

8. A method for driving a liquid crystal display device in which an image display unit includes a plurality of pixels disposed at intersection portions where a plurality of column data lines intersect a plurality of row selection lines and connected in common to a common signal line, the plurality of pixels each including a liquid crystal element having a liquid crystal layer sealed between a common electrode and a pixel electrode, a first holding unit that, upon a row selection signal being supplied via the row selection line, samples and holds subframe data outputted from a data inversion unit and supplied by the image display unit via the column data line, a transfer unit that, upon a common signal being supplied via the common signal line, transfers the subframe data held by the first holding unit, and a second holding unit that holds the subframe data transferred by the transfer unit and applies the subframe data to the pixel electrode as a pixel voltage, the method comprising:

a dithering process step of outputting data after a dithering process where the dithering process has been performed on a video signal data supplied in a temporal or spatial direction to round the video signal data to a predetermined number of bits;

a subframe data generation step of generating subframe data of each of a plurality of subframes, the subframe data being values corresponding to pixel values of the data after the dithering process, from the data after the dithering process based on a drive grayscale table to include the plurality of subframes having a shorter display period than one frame period of the video signal data in each frame of the video signal data;

a data inversion step of reversing a polarity of the subframe data for each subframe period;

an image display unit driving step of sequentially supplying the row selection signals to the plurality of row selection lines for each horizontal scanning period and supplying the row selection signals to all of the plurality of row selection lines in one frame period to sequentially select all of the plurality of pixels of the image display unit on a pixels-per-line basis, as well as repeating supplying to the plurality of column data lines the subframe data of one line of pixels processed in the data inversion step, pixel by pixel and line by line, to supply the subframe data processed in the polarity reversal step to all of the plurality of pixels of the image display unit and subsequently supply the common signal to the common signal line; and a common voltage selection step of alternately selecting a high-level common voltage and a low-level common voltage in each subframe period in synchronization with a polarity reversal operation in the polarity reversal step, and applying the common voltage to the common electrode of the liquid crystal element that is being driven in the image display unit driving step.

* * * * *